US008260778B2

(12) United States Patent
Ghatak

(10) Patent No.: US 8,260,778 B2
(45) Date of Patent: Sep. 4, 2012

(54) MOOD BASED MUSIC RECOMMENDATION METHOD AND SYSTEM

(76) Inventor: Kausik Ghatak, Bellevue, WA (US)

(*) Notice: Subject to any disclaimer, the term of this patent is extended or adjusted under 35 U.S.C. 154(b) by 535 days.

(21) Appl. No.: 12/355,742

(22) Filed: Jan. 16, 2009

(65) Prior Publication Data

US 2009/0182736 A1 Jul. 16, 2009

Related U.S. Application Data

(60) Provisional application No. 61/011,391, filed on Jan. 16, 2008.

(51) Int. Cl.
 G06F 7/00 (2006.01)
 G06F 17/30 (2006.01)
(52) U.S. Cl. .................. 707/736; 707/748; 707/758
(58) Field of Classification Search .................. None
See application file for complete search history.

(56) References Cited

U.S. PATENT DOCUMENTS

| | | | |
|---|---|---|---|
| 6,418,424 B1 | 7/2002 | Hoffberg et al. | |
| 6,460,036 B1* | 10/2002 | Herz | 707/748 |
| 6,748,395 B1 | 6/2004 | Picker et al. | |
| 7,196,258 B2 | 3/2007 | Platt | |
| 7,376,672 B2* | 5/2008 | Weare | 707/753 |
| 7,447,705 B2 | 11/2008 | Kaiser et al. | |
| 2003/0089218 A1* | 5/2003 | Gang et al. | 84/615 |
| 2006/0143647 A1* | 6/2006 | Bill | 725/10 |
| 2006/0170945 A1* | 8/2006 | Bill | 358/1.13 |
| 2006/0173838 A1* | 8/2006 | Garg et al. | 707/5 |
| 2006/0206478 A1* | 9/2006 | Glaser et al. | 707/5 |
| 2006/0254411 A1 | 11/2006 | Alcalde et al. | |
| 2007/0133357 A1* | 6/2007 | Korst et al. | 369/2 |
| 2007/0250319 A1* | 10/2007 | Tateishi et al. | 704/251 |
| 2007/0265979 A1* | 11/2007 | Hangartner | 705/59 |
| 2007/0282860 A1 | 12/2007 | Athineos et al. | |

(Continued)

OTHER PUBLICATIONS

Cont et al., "Anticipatory Model of Musical Style Imitation using Collaborative and Competitive Reinforcement Learning," In Anticipatory Behavior in Adaptive Learning Systems, M.V. Butz et al. (Eds.): ABiALS 2006, LNAI 4520, pp. 285-306, Springer Verlag, Sep. 19, 2007.

(Continued)

Primary Examiner — Angelica Ruiz
(74) Attorney, Agent, or Firm — Davis Wright Tremaine LLP; George C. Rondeau, Jr.; Heather M. Colburn

(57) ABSTRACT

A method of recommending songs to a listener. The method obtains a set of feature values for each of a plurality of songs. Whenever a playback event is generated for a song, a first reward and a Mood State Value ("MSV") based on a set of parameters are determined. Each feature value associated with the song is associated with the MSV and for each feature value, a second reward is calculated based on the first reward and is assigned to the feature value. A current MSV is determined and any songs having a feature value identical to a feature value associated with the current MSV are identified. For each song identified, a cumulative reward is calculated by totaling the second reward assigned to any feature values associated with the current MSV that are also associated with the song. Finally, one or more songs are recommended based on their cumulative rewards.

20 Claims, 20 Drawing Sheets

U.S. PATENT DOCUMENTS

| | | | |
|---|---|---|---|
| 2008/0021851 A1 | 1/2008 | Alcalde et al. | |
| 2008/0059287 A1 | 3/2008 | Bonet et al. | |
| 2008/0091717 A1* | 4/2008 | Garbow et al. | 707/104.1 |
| 2008/0114805 A1* | 5/2008 | Nord | 707/104.1 |
| 2008/0147711 A1* | 6/2008 | Spiegelman et al. | 707/102 |
| 2008/0156173 A1* | 7/2008 | Bauer | 84/601 |
| 2008/0257134 A1 | 10/2008 | Oppenheimer | |
| 2008/0275904 A1* | 11/2008 | Breebaart et al. | 707/102 |

OTHER PUBLICATIONS

Collins, Nick, "Reinforcement Learning for Live Musical Agents," Proceedings of ICMC2008, International Computer Music Conference, Belfast, 2008.

Legaspi et al., "Positing a Growth-Centric Learning of Empathy Models in HSI," The 22nd Annual Conference of the Japanese Society for Artificial Intelligence, 2008, pp. 1-4.

* cited by examiner

FIGURE 1

| Feature Type | Feature Name |
|---|---|
| Metadata | Genre |
| Metadata | Artist |
| Metadata | Album |
| Acoustic | Hash value of average strength of audio signal frequencies of uniform width computed based on Fast Fourier Transformation (FFT) of first 30 seconds of audio content, will be referred to as FREQ_HASH_30SEC henceforth |
| Acoustic | Hash value of average strength of audio signal frequencies of uniform width computed based on FFT of the whole audio content, will be referred to as FREQ_HASH_WHOLE henceforth |

FIGURE 2

| Previous Event on a song | Current Event on a song following the previous event | Reward producing event on a song |
|---|---|---|
| SYS_PLAY_STARTED | PLAY_ENDED | SYS_PLAYED |
| USER_PLAY_STARTED | PLAY_ENDED | USER_PLAYED |
| | PLAY_DELETED | PLAY_DELETED |
| | NO_PLAY_DELETED | NO_PLAY_DELETED |
| | INTERRUPTED | INTERRUPTED |
| | INTERRUPT_DELETED | INTERRUPT_DELETED |

FIGURE 3

| Reward producing event on a song | Reward Value | Significance |
|---|---|---|
| SYS_PLAYED | 10 | Listener likes the song in a given mood |
| USER_PLAYED | 100 | Listener strongly likes the song in a given mood |
| PLAY_DELETED | -100 | Listener strongly dislikes the song in a given mood |
| NO_PLAY_DELETED | -80 | Listener fairly dislikes the song in a given mood |
| INTERRUPT_DELETED | -50 | Listener dislikes the song in a given mood |
| INTERRUPTED | -5 | Listener may dislike the song in a given mood |

FIGURE 4

| Feature Name | Feature Name Identifier |
|---|---|
| Genre | 2 |
| Artist | 3 |
| Album | 4 |
| FREQ_HASH_30SEC | 5 |
| FREQ_HASH_WHOLE | 6 |

| Mood-State (α) | Feature Value | Feature Name Identifier | Reward |
|---|---|---|---|
| 5317 | Rock | 2 | <NEW_VALUE1> |
| 5317 | Singer1 | 3 | <NEW_VALUE2> |
| 5317 | Singer2 | 3 | <NEW_VALUE3> |
| 5317 | Album1 | 4 | <NEW_VALUE4> |
| 5317 | 264232 | 5 | <NEW_VALUE5> |
| 5317 | 231206 | 6 | <NEW_VALUE6> |

196

Data base table: MEDIA

| Field | Type | Null | Key | Default Value |
|---|---|---|---|---|
| ID | MEDIUMINT (8) UNSIGNED | NO | PRIMARY | |
| FILELOC | VARCHAR (300) | NO | PRIMARY | |
| NAME | VARCHAR (300) | NO | | |
| FREQ_HASH_30SEC | BIGINT (20) | YES | | NULL |
| FREQ_HASH_WHOLE | BIGINT (20) | YES | | NULL |
| PLAY_COUNTER | INT (11) | YES | | 0 |

FIGURE 11
Data base table: ARTIST_COMPOSER 
| Field | Type | Null | Key | Default Value |
|---|---|---|---|---|
| ID | MEDIUMINT (8) UNSIGNED | NO | PRIMARY | |
| NAME | VARCHAR (50) | NO | | |
Data base table: ALBUM 
| Field | Type | Null | Key | Default Value |
|---|---|---|---|---|
| ID | MEDIUMINT (8) UNSIGNED | NO | PRIMARY | |
| NAME | VARCHAR (100) | NO | | |

FIGURE 12
Data base table: GENRE_TABLE
| Field | Type | Null | Key | Default Value |
|---|---|---|---|---|
| ID | MEDIUMINT (11) | NO | PRIMARY | |
| NAME | VARCHAR (50) | NO | | |
Data base table: MEDIA_ARTIST
| Field | Type | Null | Key | Default Value |
|---|---|---|---|---|
| MEDIA_ID | MEDIUMINT (8) UNSIGNED | NO | PRIMARY | |
| ARTIST_COMPOSER_ID | MEDIUMINT (8) UNSIGNED | NO | PRIMARY | |
Note: MEDIA_ARTIST.MEDIA_ID maps to MEDIA.ID
MEDIA_ARTIST.ARTIST_COMPOSER_ID maps to ARTIST_COMPOSER.ID

FIGURE 13

Data base table: MEDIA_COMPOSER  130

| Field | Type | Null | Key | Default Value |
|---|---|---|---|---|
| MEDIA_ID | MEDIUMINT (8) UNSIGNED | NO | PRIMARY | |
| ARTIST_COMPOSER_ID | MEDIUMINT (8) UNSIGNED | NO | PRIMARY | |

Note: MEDIA_COMPOSER.MEDIA_ID maps to MEDIA.ID
MEDIA_COMPOSER.ARTIST_COMPOSER_ID maps to ARTIST_COMPOSER.ID

FIGURE 14

Data base table: MEDIA_ALBUM ← 132

| Field | Type | Null | Key | Default Value |
|---|---|---|---|---|
| MEDIA_ID | MEDIUMINT (8) UNSIGNED | NO | PRIMARY | |
| ALBUM_ID | MEDIUMINT (8) UNSIGNED | NO | PRIMARY | |

Note: MEDIA_ALBUM.MEDIA_ID maps to MEDIA.ID
MEDIA_ALBUM.ALBUM_ID maps to ALBUM.ID Data base table: MEDIA_GENRE ← 134

| Field | Type | Null | Key | Default Value |
|---|---|---|---|---|
| MEDIA_ID | MEDIUMINT (8) UNSIGNED | NO | PRIMARY | |
| GENRE_ID | MEDIUMINT (8) UNSIGNED | NO | PRIMARY | |

Note: MEDIA_GENRE.MEDIA_ID maps to MEDIA.ID
MEDIA_GENRE.GENRE_ID maps to GENRE_TABLE.ID

FIGURE 15

Data base table: STATE_PARAM_REWARD    194

| Field | Type | Null | Key | Default Value |
|---|---|---|---|---|
| STATE | BIGINT(20) | NO | PRIMARY | |
| PARAM_NAME | VARCHAR(100) | NO | PRIMARY | |
| PARAM_TYPE | INT(11) | NO | PRIMARY | |
| PARAM_VAL | DOUBLE | NO | | |
| VISIT_COUNT | INT(11) | NO | | |

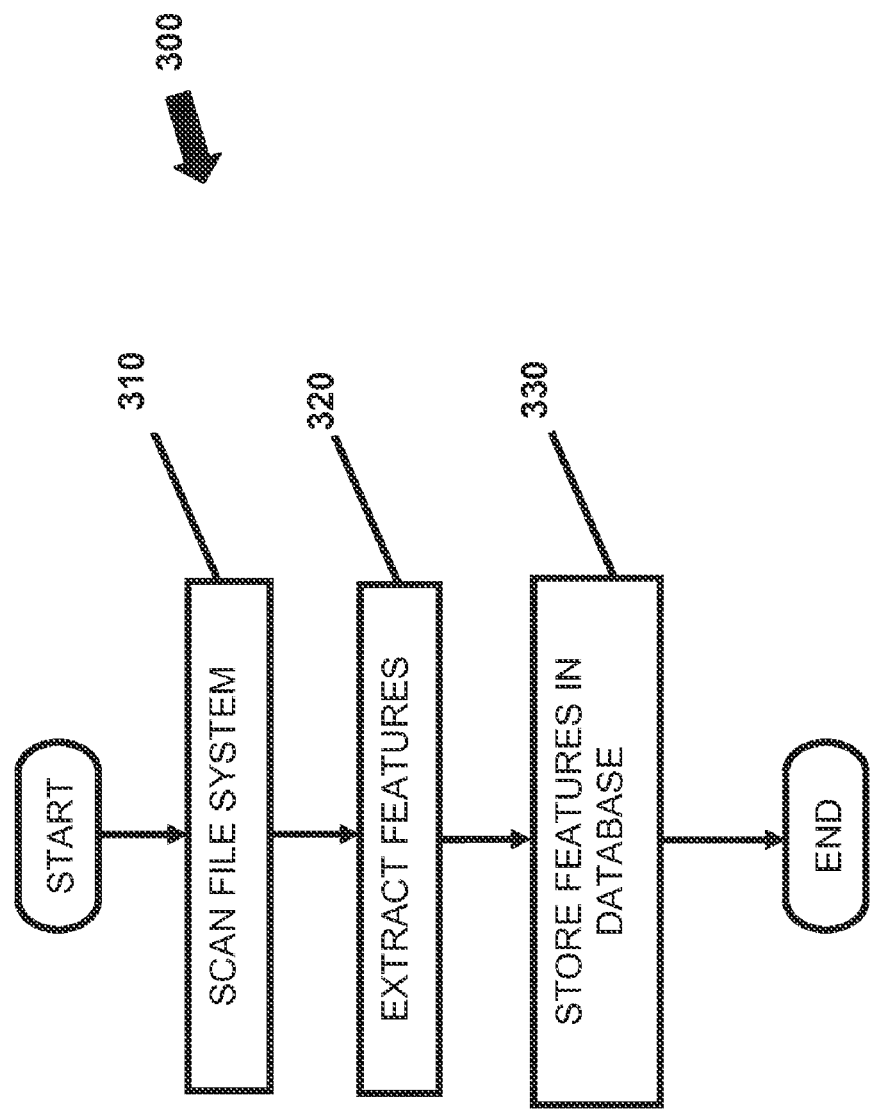

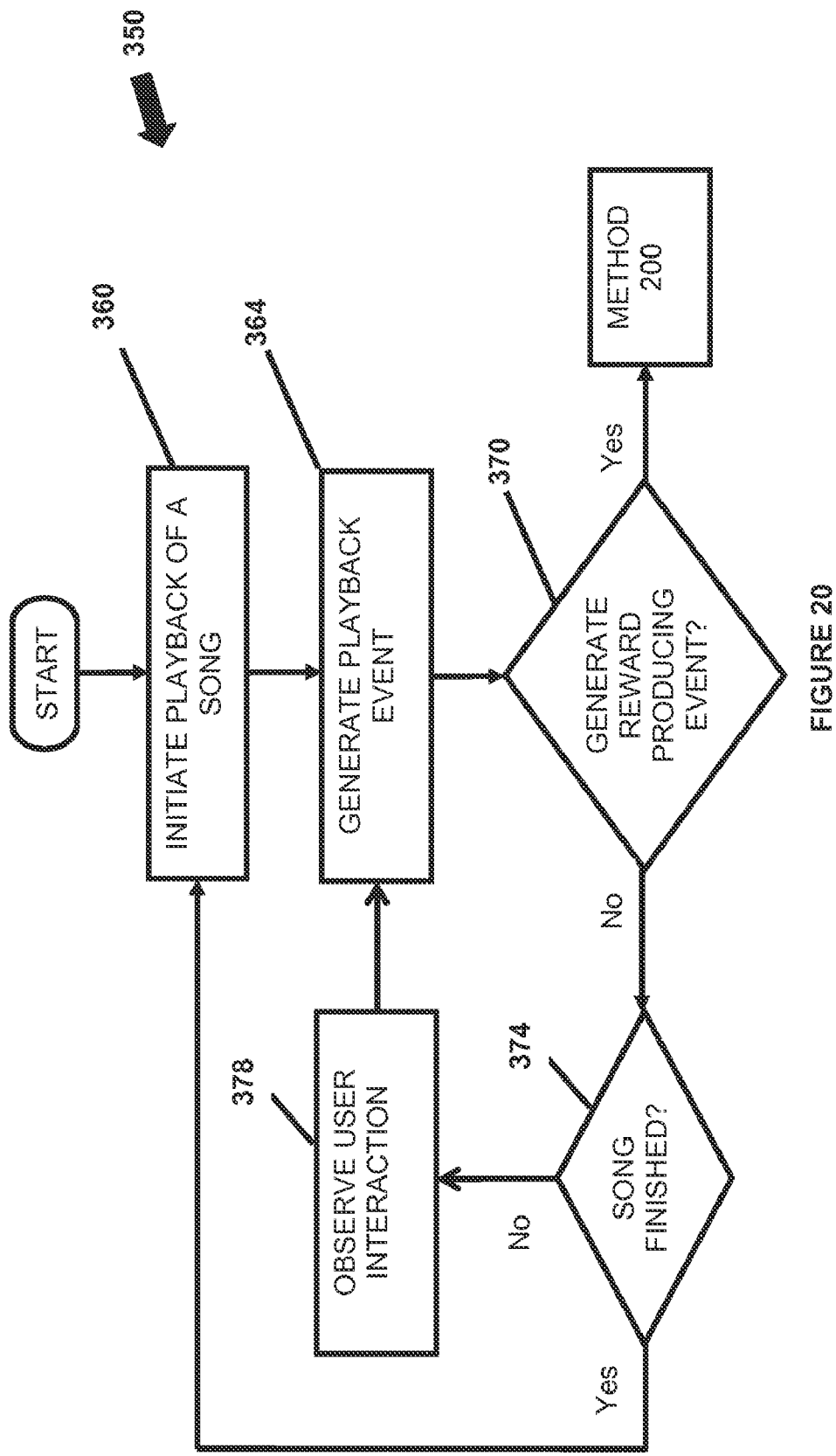

MOOD BASED MUSIC RECOMMENDATION METHOD AND SYSTEM

CROSS REFERENCE TO RELATED APPLICATION(S)

This application claims the benefit of U.S. Provisional Application No. 61/011,391, filed Jan. 16, 2008.

BACKGROUND OF THE INVENTION

1. Field of the Invention

The present invention is directed generally to a system for recommending musical compositions to a user and more particularly to a system for determining a current mood of a user and recommending musical compositions to the user based on the user's current mood.

2. Description of the Related Art

With the advancement of information technology listening to music using a computer has become a common practice. In fact, the impact of digital music has been so great that it has become a primary focus of many businesses. Numerous efforts have been made to improve the experience of listening music on a computer. One of such efforts involves automatically recommending songs to the listener.

All music/song recommendation systems use four broad categories of inputs for their recommendations: (1) metadata such as artist, album, genre, etc.; (2) acoustic features such as beats, melody, etc.; (3) direct feedback from the users such as rating; and (4) collaborative feedback such as information obtained from other users including purchasing patterns, listening patterns, and the like. A typical music recommendation system uses all or some of these inputs in various combinations. The most advanced recommendation systems typically use all of the above inputs and weigh their contribution to the music recommendation process. Nevertheless, these systems suffer from many disadvantages and shortcomings.

Liking or disliking a song is an expression of human mind. Since mood is an emotional state of human mind, it has an immense role in deciding when a person likes or dislikes something. The primary objective of a music recommendation system is to predict songs that a listener would like and hence it would be beneficial for a recommendation system to consider the mood of the listener when recommending songs. A major disadvantage of most prior art music recommendation systems is that they fail to consider a listener's mood.

However, a few recommendation systems exist that consider the mood of a listener and appreciate that mood has a great deal of influence in determining a listener's liking or disliking of songs. Unfortunately, most of these systems do not attempt to capture and quantify/qualify mood as an essential feature. Thus, these systems fail to use the effect of mood in their recommendation system. Systems that do consider mood as an essential feature use very intrusive methods such as taking a picture of the listener to capture the listener's mood. Such systems are likely to encounter greater difficulty in practical implementation due to security and privacy concerns.

Another shortcoming of most music recommendation systems is that they depend on collective generalization. In other words, data are collected from all users of a recommendation system and generalized before the data are applied and used to generate a recommendation to an individual user. Since the success of a recommendation depends on the opinion of an individual user, it is important to consider a specific individual's likes or dislikes. Because the collective generalization approach fails to consider the individual user's likes and dislikes, this approach will often make inappropriate recommendations to the user and fail to recommend choices preferred by the user.

Yet another shortcoming of many of the existing recommendation systems is that their recommendations depend on the user's direct feedback. For example, many systems ask users to rate songs. Most listeners do not rate songs because they (1) want to enjoy music and are not willing to do any extra work, and (2) listen to music in the background while focusing primarily on some other task. Since very few listeners actually take part in providing direct feedback, any recommendation that depends on such feedback provided by a very small proportion of the users fail to generate accurate recommendations.

Thus, a need exists for recommendation systems that overcome the above shortcomings. For example, a need exists for a music recommendation system that uses various inputs (such as metadata, acoustic features, etc.) and does require user input beyond observing user interaction with the system related to the selection and playback of songs. A music recommendation that considers the user's mood would also be desirable. Moreover, a need exists for a system that learns which songs to recommend based on an individual listener's mood and is capable of improving its recommendations over time.

The present application provides these and other advantages as will be apparent from the following detailed description and accompanying figures.

BRIEF DESCRIPTION OF THE SEVERAL VIEWS OF THE DRAWING(S)

FIG. 1 is a table listing exemplary features associated with a song.

FIG. 2 is a table listing a reward producing event triggered by a current playback event occurring after a particular previous playback event.

FIG. 3 is a table listing a reward value assigned to each of the reward producing events of FIG. 2 and an interpretation of each reward producing event.

FIG. 4 is a table listing exemplary feature names and a feature name identifier for each feature name.

FIG. 11 is a description of a pair of database tables, the topmost table is named "ARTIST_COMPOSER" and the lower table is named "ALBUM" both tables are stored in a database of the system of FIG. 6.

FIG. 12 is a description of a pair of database tables, the topmost table is named "GENRE_TABLE" and the lower table is named "MEDIA_ARTIST" both tables are stored in a database of the system of FIG. 6.

FIG. 13 is a description of database table named "MEDIA_COMPOSER" stored in a database of the system of FIG. 6.

FIG. 14 is a description of a pair of database tables, the topmost table is named "MEDIA_ALBUM" and the lower table is named "MEDIA_GENRE" both tables are stored in a database of the system of FIG. 6.

FIG. 15 is a description of database table named "STATE_PARAM_REWARD" stored in a database of the system of FIG. 6.

FIG. 19 is a block diagram of a method performed by the system of FIG. 6 during a scanning, extracting, and storing operation.

FIG. 20 is a block diagram of a method performed by the system of FIG. 6 during an assigning rewards operation.

DETAILED DESCRIPTION OF THE INVENTION

The Detailed Description of the Invention is set out below to enable one of ordinary skill in the art to build and use an implementation of the invention. Those of ordinary skill in the art should appreciate that they may readily use the concept and specific description disclosed as a basis for modifying the methods and systems described or designing other methods and systems for carrying out the same functions as those described below. Those of ordinary skill in the art also realize that such equivalent components do not depart from the spirit and scope of the teachings of the present application.

Figure 6:
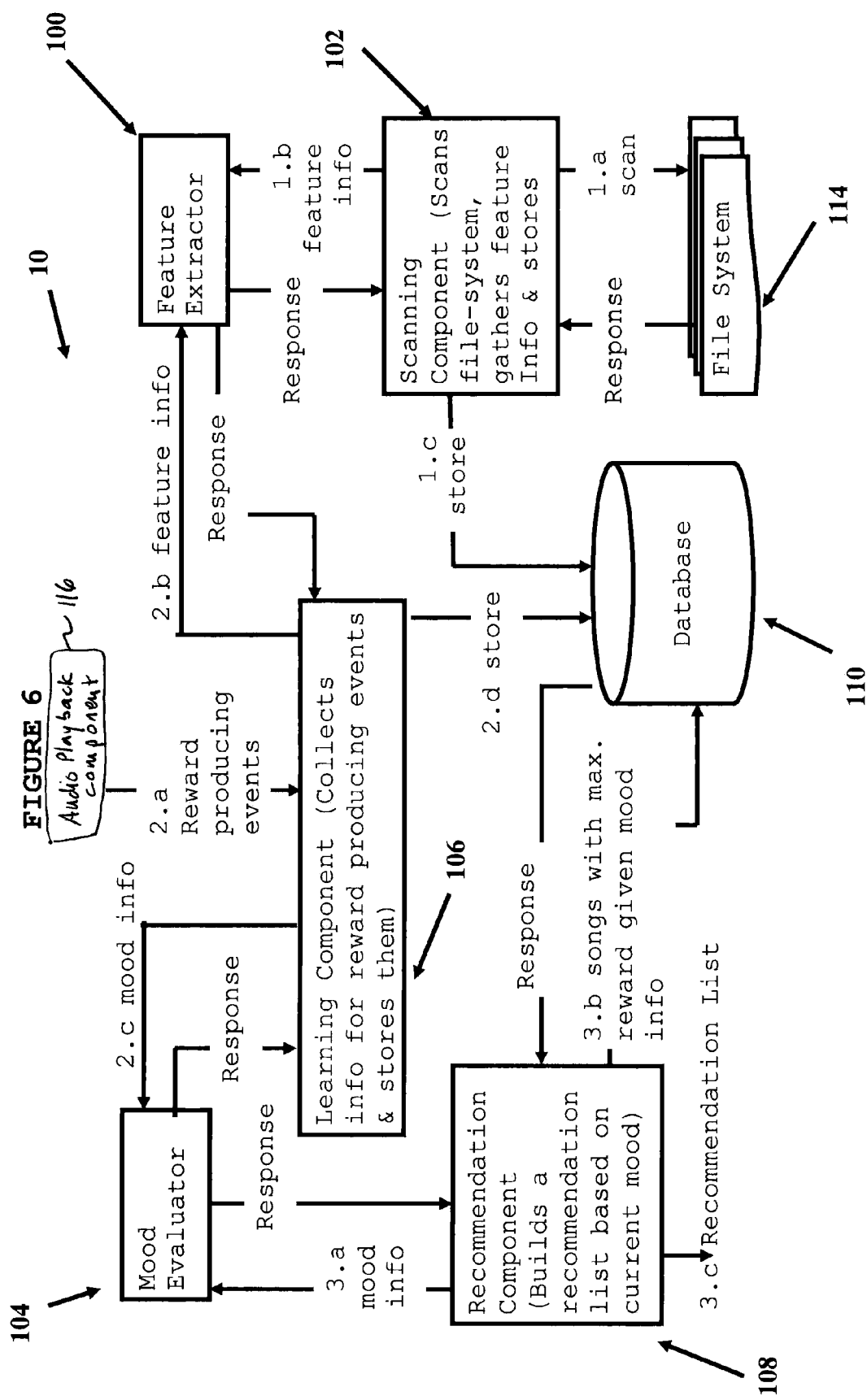
FIG. 6 is a schematic of an exemplary embodiment of the system illustrating data flows and tasks performed by the system.

Referring to FIG. 6, aspects of the present invention include a system 10 for capturing variation in the musical selections of a user based on the user's mood. Unless defined otherwise, technical and computing related terms used herein have the same meaning as commonly understood by one of ordinary skill in the art to which this invention belongs. For purposes of the present application, the following terms are defined below.

The terms 'song', 'music', 'digital audio' and 'musical composition' are used synonymously and mean a segment of audio content, such as a song, a piece of audio content, and the like that can be stored on a memory device in digital form, and played using a playback device, such as the system 10 (which may be implemented in a computing device, IPOD® portable media player, or similar music playback device) and listened to by a user operating the playback device.

The term 'feature' refers to a parameter associated with a musical composition.

The term 'listener' is synonymous with user and used to imply a person who uses the system 10 primarily for listening to music, the system learning listener's moods and song choices in those moods and using this information to recommend songs the listener may like to listen to more than other songs equally available to the listener.

As mentioned above, the system 10 captures variation in the musical selections of a user based on the user's mood. The system 10 is configured to use the captured information to generate a list of recommended musical compositions for the user. Depending upon the implementation details, the system 10 may be characterized as performing three operations: (1) a scanning, extracting, and storing operation; (2) an assigning rewards operation; and (3) a recommendation operation. There is no requirement with respect to the order in which these operations are executed by the system. However, it may be desirable to perform recommendation operation after the scanning, extracting, and storing operation and the assigning rewards operation.

Figure 18:
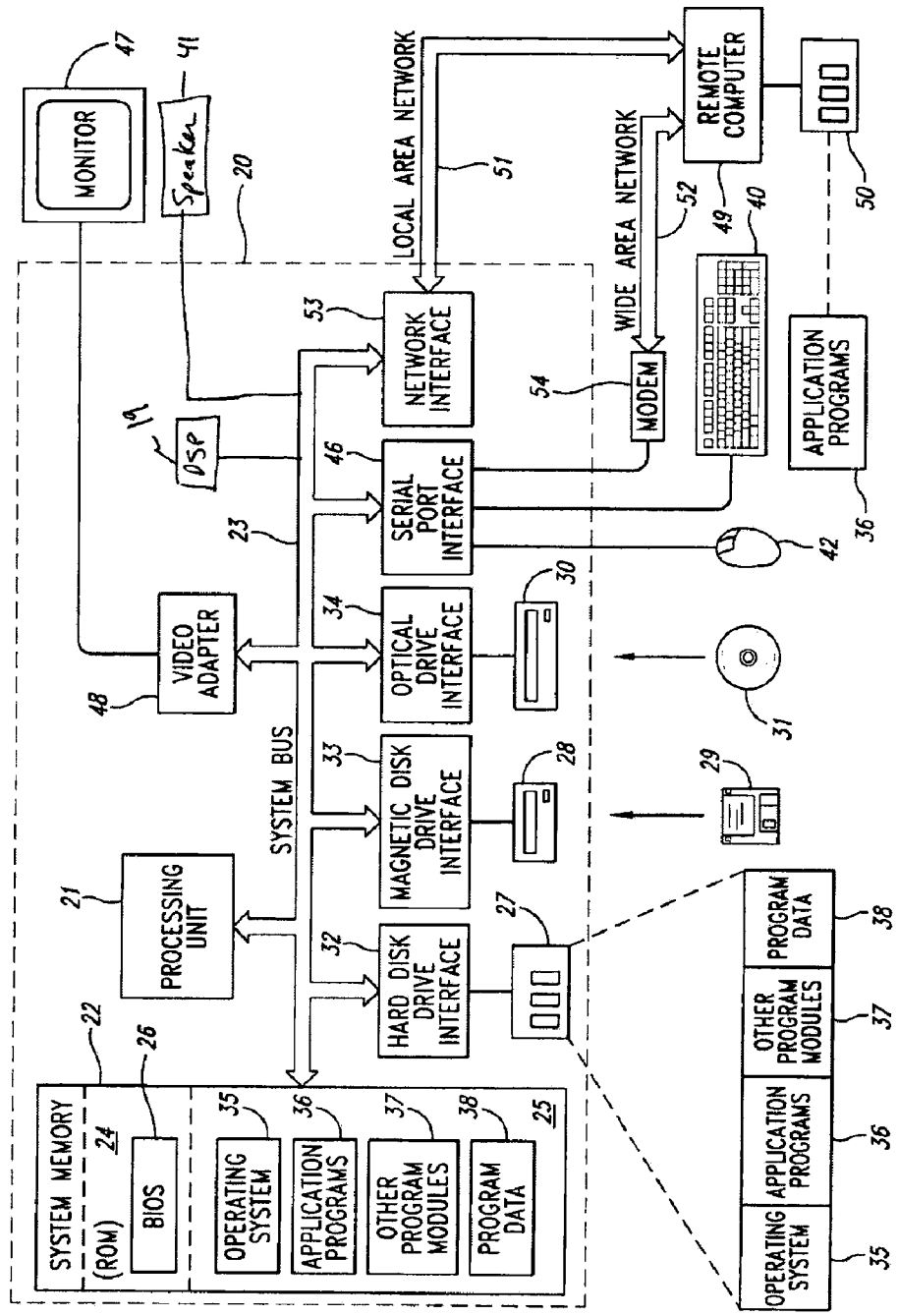
FIG. 18 is a schematic diagram of a computer environment suitable for implementing the system of FIG. 6.

Referring to FIG. 18, the system 10 may be implemented on a computing device 20. FIG. 18 is a diagram of hardware and an operating environment in conjunction with which implementations of the mood-based music recommendation method and system may be practiced. The description of FIG. 18 is intended to provide a brief, general description of suitable computing hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, portable music players (e.g., IPOD® portable media players), multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 18 includes a general purpose computing device in the form of a computing device 20, including a processing unit 21, a system memory 22, and a system bus 23 that operatively couples various system components, including the system memory 22, to the processing unit 21. There may be only one or there may be more than one processing unit 21, such that the processor of computing device 20 comprises a single central-processing unit (CPU), or a plurality of processing units, commonly referred to as a parallel processing environment. The computing device 20 may be a conventional computer, a distributed computer, or any other type of computer. Further, because the system 10 may be implemented in a music player, the computing device 20 may include a digital signal processor 19, which may used to determine acoustic features of songs.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 20, such as during start-up, is stored in ROM 24. The computing device 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computing device 20. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as one or more speakers 41 (coupled to a sound card (not shown)) and printers.

The computing device 20 may operate in a networked environment using logical connections to one or more remote computers, such as remote computer 49. These logical connections are achieved by a communication device coupled to or a part of the computing device 20 (as the local computer). Implementations are not limited to a particular type of communications device. The remote computer 49 may be another computer, a server, a router, a network PC, a client, a peer device or other common network node, and typically includes many or all of the elements described above relative to the computing device 20, although only a memory storage device 50 has been illustrated in FIG. 18. The logical connections depicted in FIG. 18 include a local-area network (LAN) 51 and a wide-area network (WAN) 52. Such networking environments are commonplace in offices, enterprise-wide computer networks, intranets and the Internet.

When used in a LAN-networking environment, the computing device 20 is connected to the local area network 51 through a network interface or adapter 53, which is one type of communications device. When used in a WAN-networking environment, the computing device 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 20, or portions thereof, may be stored in the remote memory storage device 50. It is appreciated that the network connections shown are exemplary and other means of and communications devices for establishing a communications link between the computers may be used.

The hardware and operating environment in conjunction with implementations that may be practiced has been described. The computer, in conjunction with implementations that may be practiced, may be a conventional computer, a distributed computer, or any other type of computer. Such a computer typically includes one or more processing units as its processor, and a computer-readable medium such as a memory. The computer may also include a communications device such as a network adapter or a modem, so that it is able to communicatively couple to other computers.

The computing device 20 and related components have been presented herein by way of particular example and also by abstraction in order to facilitate a high-level view of the concepts disclosed. The actual technical design and implementation may vary based on particular implementation while maintaining the overall nature of the concepts disclosed.

Referring to FIG. 6, the system 10 includes a feature extractor 100, a scanning component 102, a mood evaluator 104, a learning component 106, a recommendation component 108, and a database 110. Each of the feature extractor 100, a scanning component 102, a mood evaluator 104, a learning component 106, a recommendation component 108, and a database 110 may be implemented as software modules stored in the other programming modules 37 of the system memory 22 (see FIG. 18). The system 10 may also include any software modules and hardware components required to implement an audio playback component 116 configured to play audio files. Audio playback components are well known in the art and will not be described in detail.

The system 10 further includes a file system 114 (see FIG. 6) storing one or more audio files. The file-system 114 may include a local file system, a remotely connected file-system, and a combination thereof. The file system 114 may include any file system accessible by the computing device 20 (see FIG. 18).

Figure 8:
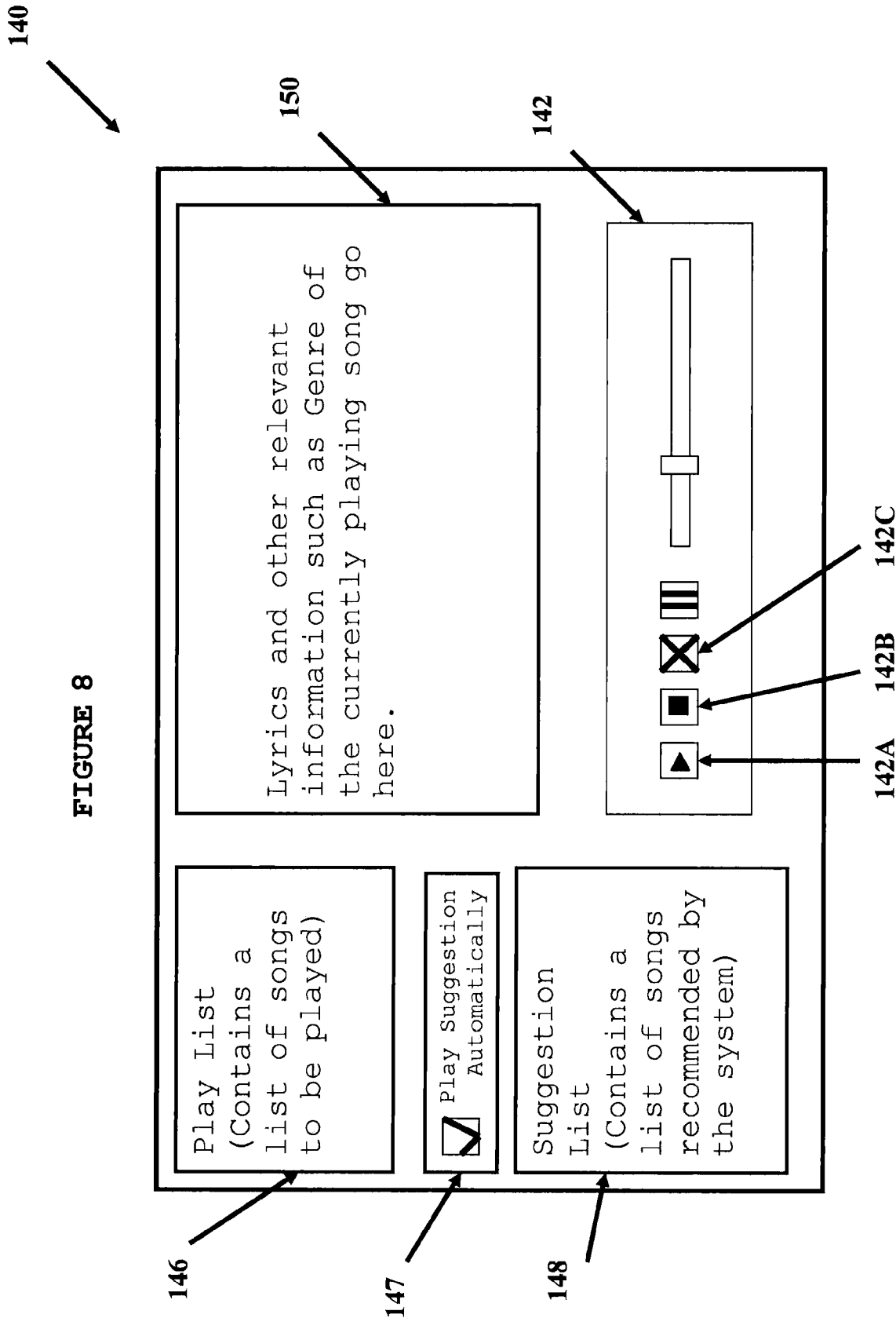
FIG. 8 is an exemplary user interface generated by the system of FIG. 6 including user controls, a lyrics display area, and a display area for other relevant information related to a currently playing song.

Referring to FIG. 8, the system 10 generates a user interface 140 having playback controls 142, which may include any standard music playback controls known in the art. As is apparent to those of ordinary skill in the art, the audio playback component 116 is configured to receive commands from the playback controls 142. In the embodiment illustrated in FIG. 8, the playback controls 142 include a "Play" control 142A, a "Stop" control 142B, and a "Remove/Delete" control 142C. The user interface 140 also includes an area 146 in which to display a playlist that allows the listener to instruct the system regarding which songs to play back. The user interface 140 further includes an area 148 in which a recommendation list may be displayed. The user interface 140 may include a control, such as a check-box control 147, that is selectable by the user and when selected, instructs the system 10 to play automatically the recommended songs listed in the recommendation list. In particular implementations, the user interface 140 may implement a drop-and-drag interface or control that allows the user to selectively drag a recommended song from the recommendation area 148 and drop the selected song into the playlist area 146 thereby instructing the system 10 to play the recommended song. Optionally, the user interface 140 includes a lyrics display region 150.

The system 10 may be implemented in any system that provides a hardware environment substantially functionally equivalent to that illustrated in FIG. 18, functional components substantially functionally equivalent to those illustrated in FIG. 6, and a user interface similar to the user interface 140 illustrated in FIG. 8. Thus, those of ordinary skill in the art appreciate that the system 10 is not limited to implementation on a general computing device, such as the computing system 20, and like computing devices. In alternate implementations, the system 10 may be implemented on a Portable Media Player, such as an IPOD® portable media player, a ZUNE® portable media player, and the like, a Mobile telecommunications device, such as an IPHONE® mobile telecommunications device, T MOBILE G1® mobile telecommunications device, and the like, an embedded system (e.g., an AMAZON KINDLE® device), a personal digital assistant ("PDA"), a Video Game Console, such as a MICROSOFT XBOX 360® video game console, a SONY PLAYSTATION® 3 video game console, and the like. Further, those of ordinary skill appreciate that through the application of ordinary skill in the art to the present teachings alternate implementations may be constructed within the scope of the present invention.

Scanning, Extracting, and Storing Operation

The scanning, extracting, and storing operation can be divided further into several tasks described below. FIG. 19 provides a block diagram of a method 300 performed during the scanning, extracting, and storing operation.

In first block 310, the scanning, extracting, and storing operation scans the file-system 114 to gather a list or collection of songs "S." Returning to FIG. 6, block 310 may be performed by the scanning component 102. In block 310, as the scanning component 102 performs the scanning operation, the feature extractor 100 extracts a list of predefined features from each song located by the scanning component 102. The features may be categorized into two feature types: metadata features, and acoustic features. By way of a non-limiting example, FIG. 1 provides a non-exhaustive list of metadata features, and acoustic features that may be associated with a song. Metadata features are obtained from tags associated with a song and acoustic features obtained by applying digital signal processing techniques to a song.

The feature extractor 100 of the system 10 is configured to interpret standard music file formats such as MP3, WAV, WMA, and the like, to retrieve information related to any metadata features associated with a particular song.

To extract acoustic features, the feature extractor 100 applies digital signal process techniques known in the art. By way of an example, the feature extractor 100 extracts an acoustic feature "FREQ_HASH_30SEC" and an acoustic feature "FREQ_HASH_WHOLE" from each song. When extracting the acoustic feature "FREQ_HASH_30SEC," the feature extractor 100 reads the digital audio data of that song for 30 seconds and when extracting the acoustic feature "FREQ_HASH_WHOLE," the feature extractor 100 reads the digital audio data for the entire duration of the song. The system 10 simultaneously performs a Fast Fourier Transformation ("FFT") of the audio data read. Then, the feature extractor 100 divides the overall frequency measurement into equally spaced frequency bands and calculates an average strength for each frequency band. Finally, the feature extractor 100 determines a hash value for the averages obtained from each frequency band using a hashing technique described below. By way of a non-limiting example, the following formula may be used by the feature extractor 100 to calculate the hash value ("$H_{Freq}$") for a frequency band:

$$H_{Freq} = [\text{floor}(\bar{a}(i)/d) \times (\text{floor}(k/d))^{(i-1)}] \text{ over } i$$

Where
i=1, 2 ... D
D=Number of frequency bands
$\bar{a}(i)$=Average strength of $i^{th}$ frequency band
d=Width of each hash bucket along $i^{th}$ frequency band for all i
k=Total number of possible values of $\bar{a}(i)$ starting with zero, for all i
floor(y)=Largest integer value less than or equal to any real number y By way of a non-limiting example, variable "D" may be set to 8, variable "d" may be set to 8, and variable "k" may be set to 1024. The value $\bar{a}(i)$ is calculated from the results of the FFT for $i^{th}$ frequency band. The acoustic feature "FREQ_HASH_30SEC" is equal to $H_{Freq}$ when $\bar{a}(i)$ is calculated using only the first 30 seconds of audio of a song. The acoustic feature "FREQ_HASH_WHOLE" is equal to $H_{Freq}$ when $\bar{a}(i)$ is calculated using the entire duration of a song.

Then, in block 330, after the metadata features and acoustic features have been extracted, the system 10 stores them in the database 110 and the method 300 terminates. Referring to FIGS. 10-15, by way of a non-limiting example, the information stored in the database 110 may be organized in eight tables: a MEDIA table 120, an ARTIST_COMPOSER table 122, an ALBUM table 124, a GENRE_TABLE table 126, a MEDIA_ARTIST table 128, a MEDIA_COMPOSER table 130, a MEDIA ALBUM table 132, and a MEDIA_GENRE table 134. However, there are no specific requirements related to either the database 110 or the data layout of the tables 120-134.

By way of a non-limiting example, the system 10 may use Algorithm 1 below to store information (e.g., metadata features and acoustic features) associated with each song in the tables 120-134.

Algorithm 1 (Storing a song's Information):

```
If a song already exists in MEDIA table then
    Take no action
Else
    Insert a row into MEDIA table
    If insertion into MEDIA table fails then
        Take no action
    Else
        If artist info. exists for the song then
            Insert row(s) into ARTIST_COMPOSER table
            Insert row(s) into MEDIA_ARTIST table
        End If
        If composer info. exists for the song then
            Insert row(s) into ARTIST_COMPOSER table
            Insert row(s) into MEDIA_COMPOSER table
        End If
        If album info. exists for the song then
            Insert row(s) into ALBUM table
            Insert row(s) into MEDIA_ALBUM table
        End If
        If genre info. exists for the song then
            Insert row(s) into GENRE_TABLE table
            Insert row(s) into MEDIA_GENRE table
        End If
    End If
End If
```

Assigning Rewards Operation

Figure 16:
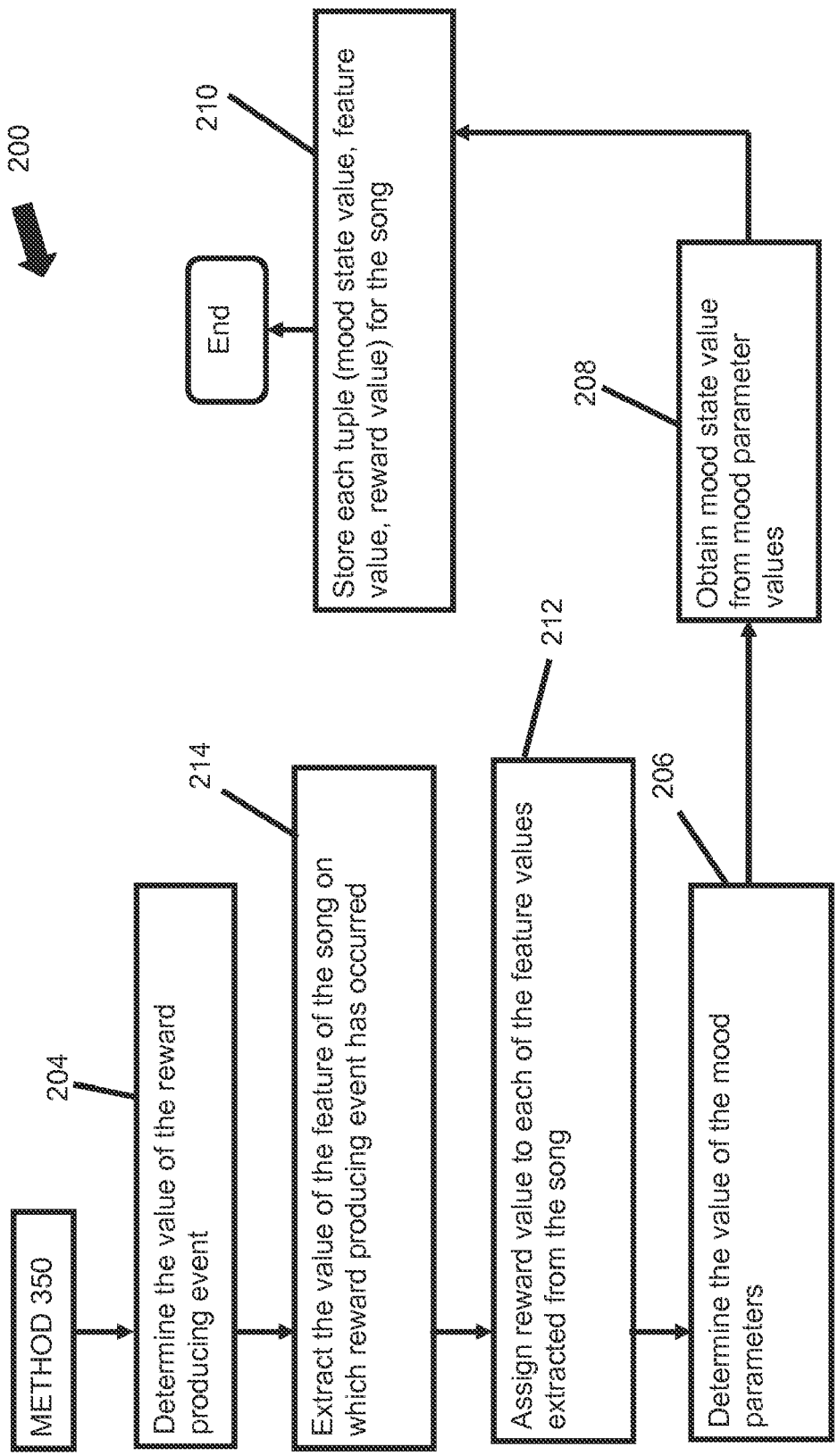
FIG. 16 is a block diagram of method performed by the system of FIG. 6 during an assigning rewards operation.

FIGS. 16 and 20 provide block diagrams of methods 200 and 350, respectively, portions of which may be performed by the learning component 106 (see FIG. 6) as it performs assigning rewards operation. Turning to FIG. 20, in method 350, the system 10 observes the listener's interactions with the system while the listener uses the system to play back music. Thus, in first block 360, playback of a song is initiated by the user or the system 10 automatically. Alternatively, in block 360, the user may delete a song without first playing the song. As described below, when a song is deleted (or removed from the playlist) in this manner, a playback event may be generated by the system 10.

In block 364, a playback event is generated by the system 10. In the implementation illustrated in the figures, playback events are generated by the audio playback component 116 (see FIG. 6). Then, at decision block 370, the system 10 determines whether to generate a reward producing event. As will be described below, the decision in decision block 370 is based on which playback events were previously generated by the system 10. In the implementation illustrated in the figures, reward producing events are generated by the audio playback component 116 (see FIG. 6).

If the decision in decision block 370 is "YES," the method 200 is performed. If the decision in decision block 370 is "NO," in decision block 374, the system 10 determines whether playback of the song initiated in block 360 has finished. If playback has finished, the system 10 returns to block 360, whereat playback of another song may be initiated.

If playback has not finished, the system 10 advances to block 378, whereat the system 10 monitors or observes the user's interaction with the playback controls 142 (see FIG. 8). Based on these observations, the system 10 advances to block 364 to generate playback events. Thus, block 374 observes the user until the learning component 106 detects the user has taken an action for which a playback event may be generated. The playback events are assigned to the song currently being played back by the system 10 or the song for which playback has most recently finished. The song being played may have been selected by the user from the playlist (optionally displayed to the listener in the area 146 of the user interface 140 illustrated in FIG. 8),automatically played by the system 10 based on the ordering of the playlist, or automatically played from the recommendation list (optionally displayed in the area 148 of the user interface 140). The playlist may list the songs located by the scanning component 102, which are the songs that are used to produce recommendations.

A non-limiting list of exemplary playback events is provided in Table 1 below along with a description of listener interactions that trigger the playback event.

TABLE 1

| Event Name | Event Description | Listener Interactions that would trigger the event |
| --- | --- | --- |
| SYS_PLAY_STARTED | Event is generated when the system automatically starts to play without listener's intervention. | No action from listener |
| USER_PLAY_STARTED | Event is generated when a listener instructs the system via the playback controls 142 (see FIG. 8) to play a song. | Listener applies the "Play" control 142A to play the song |
| PLAY_ENDED | Event is generated when a song finished playing after having been played back in its entirety irrespective of how the play back of the song was initiated (listener instructed or automatic). | No action from listener |
| INTERRUPTED | Event is generated when a song is stopped before being played back in its entirety. | Listener either applies the "Stop" control 142B (see FIG. 8) with respect to a currently playing song or applies the "Play" control 142A with |

TABLE 1-continued

| Event Name | Event Description | Listener Interactions that would trigger the event |
| --- | --- | --- |
| | | respect to a different song before the song currently playing has finished |
| PLAY_DELETED | Event is generated when a song is deleted from the playlist while it is being played. | Listener applies the "Remove/Delete" control 142C with respect to a currently playing song |
| NO_PLAY_DELETED | Event is generated when a song is deleted from the playlist when it is not being played or prepared to be played. | Listener applies the "Remove/Delete" control 142C to a song not being played or prepared to be played |
| INTERRUPT_DELETED | Event is generated when a song is deleted from the playlist when it is being prepared to be played or is halted (e.g., paused) but is not currently being played. | Listener applies the "Remove/Delete" control 142C to a song being prepared to be played or halted (e.g., paused) but is not currently being played |

Figure 7:
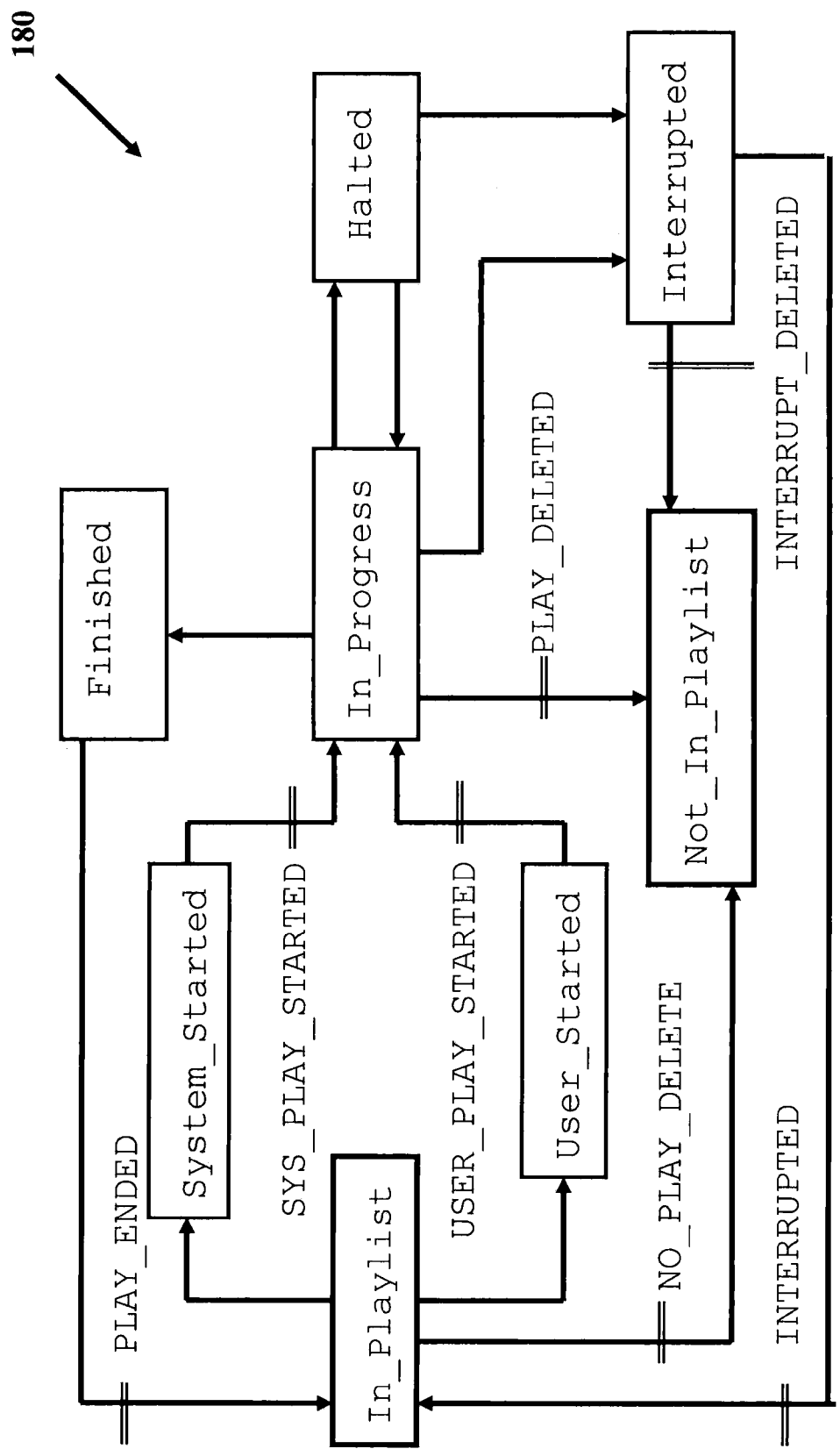
FIG. 7 is an illustration of a life-cycle of a song in a playlist illustrating the location of playback events generated by the system of FIG. 6 at state transitions in the life-cycle.

In the system 10, a song may be characterized as having a life-cycle with multiple life-cycle states. FIG. 7 depicts a state diagram 180 illustrating a plurality of boxes each corresponding to a life-cycle state of a song inside the playlist. The state diagram 180 depicts the inter-relationship between the life-cycle states within a song's life-cycle and the playback events generated by the system 10. As illustrated, the playback events determine when the song transitions to a different life-cycle state. Life-cycle state transitions are depicted as lines each having an arrowhead directed away from a first state towards a second state into which the song is transitioning. The playback events are illustrated as double lines intersecting the arrow-headed life-cycle state transition lines. Thus, as a listener performs various basic actions using the playback controls 142 (see FIG. 8) of the user interface 140, such as "Play," "Pause," "Stop," etc., with respect to a selected song, the life-cycle state of the song is continuously transitioning in the playlist.

As mentioned above, when the playback events (listed in Table 1) occur in the various sequences listed in FIG. 2, the decision in decision block 370 is "YES," and the system 10 generates a reward producing event (see the rightmost column of FIG. 2).

Turning to FIG. 16, in first block 204, the learning component 106 of the system 10 captures the reward producing events and assigns a reward value to the reward event. FIG. 2 provides a table listing a most recently generated (or current) playback event in the center column, a playback event that occurred previous to the current playback event in the leftmost column, and a reward producing event generated for a song whenever the current playback event is preceded by the previous playback event with respect to the song. No reward producing events are generated otherwise.

The relationship between the reward producing events (see the rightmost column of FIG. 2) of the system 10 and the life-cycle states (see FIG. 7) of a song in the playlist can be expressed using a Backus-Naur form ("BNF") specification as given below. A BNF specification is a set of derivation rules, written as <symbol>::=<expression with symbols> where <symbol> is a non-terminal, and the expression consists of sequences of symbols and/or sequences separated by the vertical bar, "|", indicating a choice, the whole being a possible substitution for the symbol on the left. Symbols that never appear on left side are terminals.

| BNF SPECIFICATION |
|---|
| <USER_PLAYED> ::= <User_Started> <Uninterrupted_Progress> <Finished> <SYS_PLAYED> ::= <System_Started> <Uninterrupted_Progress> <Finished> <NO_PLAY_DELETED> ::= <In_Playlist> <Not_In_Playlist > <PLAY_DELETED> ::= < Uninterrupted_Progress> <Not_In_Playlist> <INTERRUPT_DELETED> ::= < Interrupted> <Not_In_Playlist> <INTERRUPTED> ::= <Halted> <Interrupted> \| <Uninterrupted_Progress> <Interrupted> <Uninterrupted_Progress> ::= <In_Progress> \| <Uninterrupted_Progress> <Halted> <In_Progress> |

Once a reward producing event is generated based on one of the various sequences of playback events listed in FIG. 2, a reward value is assigned in accordance with a predefined rule. By way of a non-limiting example, FIG. 3 provides a table 190 listing an example reward value for each reward producing event. By assigning a positive reward value to a reward producing event that indicates a listener likes a song and assigning a negative reward value to a reward producing event that indicates listener dislikes a song, the system 10 may recommend songs that are likely to be preferred by the listener.

Reward events that indicate a greater user preference for a song should be assigned larger (e.g., positive) rewards. For example the reward producing event "USER_PLAYED" should be assigned a higher value than the reward producing event "SYS_PLAYED" because the fact that a song was played by the user (identified by "USER_PLAYED") indicates user's higher preference for the song than is indicated when the song is played automatically by the system 10 (identified by "SYS_PLAYED"). Similarly, Reward events that indicate a greater user dislike for a song should be assigned smaller (e.g., negative) rewards.

Next, in block 214, a set of feature values is obtained for the song associated with the reward producing event. If features have not been extracted previously for the song currently playing (e.g., the currently playing song was added to the file system 114 after the scan component 102 scanned the file system for audio files), after a reward producing event has been generated, the system 10 extracts the features and their corresponding values from the song for which the reward producing event has been generated. For example, the system may extract some or all of the features listed in the table of FIG. 1. Alternatively, the system 10 may extract none of the features listed in the table of FIG. 1. This nondeterministic behavior of the features' information is due to the fact that not all digital songs follow the same standard or provide certain metadata feature information. However, since the system 10 uses features of a song rather than the song to assign the reward value, the system 10 may not introduce any anomalies that could be caused by accepting the nondeterministic behavior. Depending upon the implementation details, this may make the system 10 more robust at the cost of slowing the learning of the system 10.

Moreover, the acoustic features may be selected to ensure that all songs playable by the system 10 have at least one acoustic feature. In such implementations, if a song does not have any features (acoustic or metadata), the system 10 may assume the song is either corrupted or non-playable. This makes the song less likely to be recommended since the recommendation algorithm searches for songs with matching features that have been assigned reward values.

If features were extracted previously for the song currently playing, in block 214, the system 10 may look up the features and values for each associated with the song in the database 110.

Next, in block 212, the reward associated with the reward producing event is assigned to each feature value obtained in block 214.

When a reward producing event has occurred with respect to a song, along with the reward and feature information associated with a song, the system 10 also calculates a quantitative measure of the listener's mood. Depending upon the implementation details, the mood evaluator 104 may quantify the listener's mood to produce a mood state value for the listener.

Capturing human mood is a challenge because of the restricted resources available on the computing device 20 on which the recommendation system 10 is implemented, and a need to respect a listener's privacy. Further, capturing mood may be challenging because the recommendation system 10 does not enlist the listener's participation to help in capturing the listener's mood.

To quantify the listener's mood, a collection of parameters may be carefully chosen that have significance in understanding the listener's mood. In other words, parameters are chosen that are believed to reflect or influence the listener's mood. Thus, the parameters may be correlated with mood. It may be desirable to select parameters that are also easy to compute and/or do not violate the privacy of the listener. By way of a non-limiting example, the parameters listed in Table 2 below may be used.

TABLE 2

| Parameters for Capturing and Quantifying Mood | Significance |
|---|---|
| Day of a week | In general, a typical person follows a routine including activities of some sort every day, which have a cyclic nature of periodicity over the seven days of the week, therefore, without being limited by theory, it may be inferred that each day of the week will bear the same cyclic variation in human mood. Specifically, it may be assumed that a listener's mood will be similar each week on a specific day, say every Friday. |
| Hour of a day in a 24 Hr clock | In general, a typical person follows a routine including some sort of activities at a specific time of day, which has a cyclic nature and therefore, without being limited by theory, it may be inferred that a listener's mood at a specific time of day will be the same on any day. Specifically, it is assumed a listener's mood will be similar each day at a specific time of day, for example every evening at 6pm when listener comes back from work. |
| Weather | In general, a typical person's mood is influenced by weather. Specifically, it is assumed a listener's mood will be similar for a specific weather condition independent of the day of week. For example, a bright sunny day may induce a preference for melodic and rhythmic songs, while a rainy day may induce a preference for romantic songs. |

TABLE 2-continued

| Parameters for Capturing and Quantifying Mood | Significance |
|---|---|
| Activeness | In general, a person's mood has a relation with his/her activeness at that moment. Specifically, it is assumed when a listener is enjoying wine and listening to music, the listener has a different mood than when the listener is busy finishing a thesis paper and playing music in the background. In both the cases, the listener's activeness with respect to the computing device 20 has a relationship to the listener's mood. |
| Volume Level | In general, volume level has a relationship with human mood. For example, during a party, a listener is more likely to playback a song at a greater volume level than the listener normally uses to play back songs on a calm and quiet evening. In this manner, the listener's mood on a calm evening can be qualified as an ordinary mood whereas the user's mood during the loud party can be qualified as a mood that is different from the ordinary mood. |

It may be desirable to ensure the system 10 does not introduce any anomalies caused by a lack of information or a lack of precision in the measurement of the parameters used to quantify mood. For this reason, the system 10 may implement a reward based artificial intelligence system. A Reinforcement Learning based rewarding system does not require prior knowledge of the environment or the domain and automatically adjusts itself to return an item within a collection of items assigned a maximum reward value within the collection. Because, in particular implementations, a positive reward value is assigned to a reward producing event that indicates the listener likes a song and a negative reward value is assigned to reward producing event that indicates listener dislikes the song, the system 10 may recommend songs that are likely to be preferred by the listener.

In block 206, a value is obtained for each of the mood parameters. Table 3 below provides a non-limiting example of how the system 10 measures the parameters listed in Table 2 above used to capture a listener's mood and how the system may quantify each of the parameters.

TABLE 3

| Parameters for Quantifying Mood | Methods For Measuring | Possible Values |
|---|---|---|
| Day of a week | Computing Device 20 System Clock | Assign numerical values to days of week, e.g., Sunday = 0, Monday = 1, . . . , Saturday = 6. |
| Hour of a day in a 24 Hour clock | Computing Device 20 System Clock | Divide a day into portions, and assign a unique numerical value to each portion. For example, a day may be divided into six four-hour portions and assigned the following values: [00:00-03:59 Hrs] = 0, [04:00-07:59 Hrs] = 1, . . . [20:00-23:59 Hrs] = 5 |
| Weather | Internet | Classify into a predetermined number of weather types and assign a value to each. For example, the following rule may be used: cloudy = 0, sunny = 1, rainy = 2, and snow = 3. |
| Activeness | Number of movements of pointing device such as mouse pointer of the listener's computing device 20 captured over a duration of time while the system 10 is active | Capture number of mouse movements over a predetermined period (e.g., 5 minutes) and classify movements into a predetermined number of types, assign a numerical value to each type. For example, the following rule may be used: Number of mouse movements less than 6 (implies No Activity) Activeness = 0, Number of mouse movements between 6 and 40 (implies Medium Activity) Activeness = 1, Number of mouse movements between 41 and 80 (implies High Activity) Activeness = 2 Number of mouse movements above 80 (implies Very High Activity) Activeness = 3 |
| Volume Level | Maximum volume level of all un-muted speakers of the listener's computing device 20 (see FIG. 18) where the system 10 is running. Maximum volume level may be scaled to range from 0 to 100, where 0 corresponds to the lowest maximum volume level and 100 corresponds to the highest maximum volume level | Capture the volume level, classify it into one of a predetermined number (e.g., five) types, and assign a value to each type. For example, the following rule may be used: Mute or maximum volume level [0-5] (implies Silent) Volume Level = 0, Maximum volume level [5-20] (implies Almost silent) Volume Level = 1, Maximum volume level [20-40] (implies Moderately Loud) Volume Level = 2, Maximum volume level [40-60] (implies Loud) Volume Level = 3, and Maximum volume level [60-100] (implies Very Loud) Volume Level = 4 |

Then, in block 208, the system 10 quantifies a mood state value for the listener based on a measurement or value obtained for each of the parameters in block 206. The system 10 views each mood state value as a point in a k-dimensional space, where the variable "k" is the number of parameters used to quantify the mood state value. If the parameters listed in Table 3 above are used, the variable "k" is equal to 5.

By way of a non-limiting example, the system 10 may use three bits for each parameter to compute the mood state value using the following method. If the character string "LLLAAAWWWHHHDDD" represents the first 15 low order bits of a mood state value with each character representing a bit, the day of the week occupies the first three low order bits ("DDD"), the hour of the day occupies the next three low order bits ("HHH"), the weather occupies the next three low order bits ("WWW"), the activeness occupies the next three low order bits ("AAA"), and the volume level occupies the next three low order bits ("LLL"). The rest of the bits of the mood state value may be set to zero.

By using designated bits for each parameter of the mood state value, the system 10 can retrieve specific mood information using efficient bit-wise operators provided by the processing unit 21 of the computing device 20 illustrated in FIG. 18. Further, the system 10 can evaluate neighboring mood-states by varying one or more of the parameter values within a valid range of values for that parameter.

Then, in block 210, the system 10 stores the information associated with the song for which the reward producing event was generated, in the table 194 (see FIG. 15) in the database 110. The information stored includes the mood-state value "α," a set of feature values "F" associated with the song for which the reward producing event was generated, and the reward value "R." Referring to the table 194, the tuple (mood-state value, feature value, feature name identifier) may be used as a primary key where "mood-state value" uniquely maps to a field "STATE", "feature value" uniquely maps to a field "PARAM_NAME", and "feature name identifier" uniquely maps to a field "PARAM_TYPE.". By non-limiting example, the system 10 may use a numeric value ("feature name identifier") to identify a feature type stored in the field "PARAM_TYPE" (see FIG. 15). FIG. 4 provides a non-limiting example of feature name identifiers that may be assigned to the feature names listed in FIG. 1. The feature name identifier helps the system 10 identify when two or more features have same value. This process and the kind of information stored by the system 10 may be better understood with respect to an illustrative Example 1 below.

EXAMPLE 1

Figure 5:
FIG. 5 is an example of information stored by the learning component of the system of FIG. 6 when a reward producing event is generated for a song.

If a song has a metadata feature "genre" with its value equal to "Rock", a metadata feature "artist" with its value equal to "Singer1" and "Singer2", a metadata feature "album" with its value equal to "Album1", an acoustic feature "FREQ_HASH_30SEC" value equal to "264232," and an acoustic feature "FREQ_HASH_WHOLE" value equal to '231206' and receives a reward value of 100 in a mood state value "α"=5317, the database rows that will be either inserted or updated in the table 194 of the database 110 are shown in FIG. 5.

The system 10 calculates a value "NEW_VALUE" for the field "REWARD" (shown in the right-most column in FIG. 5) based on the equation below:

$$V_{NEW} = Pr\{e=e1\} \times [R + (y \cdot V_{OLD})]$$

Where

γ (discount factor, must be less than one). By way of a non-limiting example, γ may be set to 0.4.

Pr{e=e1}=Probability that a reward producing event "e" that occurred with respect to a song is reward producing event "e1" which is equal to the probability of choosing any one of the possible reward producing events, which is equal to ⅙ in implementations that generate six reward producing events (see FIG. 2).

R=Reward produced by the reward producing event e1 with respect to a song that contains the feature values in concern $V_{OLD}$=Reward of a feature value before the update. Its value may initially be set to zero.

$V_{NEW}$=Reward of a feature value after the update

If a database row identified by the tuple (mood-state, feature value, feature name identifier) already exists in the table 194 of the database 110, the system 10 replaces the value "NEW_VALUE" in the field "REWARD" with $V_{NEW}$. Otherwise, if table 194 does not have a database row identified by the tuple (mood-state, feature value, feature name identifier), the system inserts a new database row in the table 194 and sets the field "REWARD" equal to the $V_{NEW}$.

The system 10 may use database stored procedures or other techniques known in the art to store reward information. For example, a stored procedure "PROC_UPDATE_STATE" may insert or update database row(s) in the table "STATE_PARAM_REWARD" illustrated in FIG. 15 and identified by reference numeral 194. An example of some of the information stored in the table 194 (labeled "STATE_PARAM_REWARD" in FIG. 15) is provided in FIG. 5 and the definition of the stored procedure "PROC_UPDATE_STATE" along with its dependency stored procedures is given below as Stored Procedures 1 through 5.

Stored Procedure 1:

```
create procedure PROC_UPDATE_STATE (IN REWARD_VAL
DOUBLE, IN STATE_VAL BIGINT, IN FREQ_HASH_30SEC
VARCHAR(25), IN FREQ_HASH_WHOLE VARCHAR(25),
IN GENRELIST_VAL VARCHAR(500), IN ARTISTLIST_VAL
VARCHAR(500), IN ALBUMLIST_VAL VARCHAR(500) , IN
STR_DELIMETER VARCHAR(10))
BEGIN
    CALL PROC_UPDATE_STATE_REWARD (REWARD_VAL,
    STATE_VAL, FREQ_HASH_30SEC, FREQ_HASH_WHOLE,
    GENRELIST_VAL, ARTISTLIST_VAL, ALBUMLIST_VAL,
    STR_DELIMETER);
END;
```

Stored Procedure 2:

```
create procedure PROC_UPDATE_STATE_REWARD (IN REWARD_VAL
DOUBLE, IN STATE_VAL BIGINT, IN FREQ_HASH_30SEC
VARCHAR(25), IN FREQ_HASH_WHOLE VARCHAR(25), IN
GENRELIST_VAL VARCHAR(500), IN ARTISTLIST_VAL VARCHAR(500),
IN ALBUMLIST_VAL VARCHAR(500) , IN STR_DELIMETER VARCHAR(10))
BEGIN
    CALL PROC_PROCESS_STRING_REWARD_TBL (REWARD_VAL,
        STATE_VAL, FREQ_HASH_30SEC, 5, STR_DELIMETER);
    CALL PROC_PROCESS_STRING_REWARD_TBL (REWARD_VAL,
        STATE_VAL, FREQ_HASH_WHOLE , 6, STR_DELIMETER);
    CALL PROC_PROCESS_STRING_REWARD_TBL(REWARD_VAL ,
        STATE_VAL, GENRELIST_VAL, 2, STR_DELIMETER );
    -- 2 for genre
    CALL PROC_PROCESS_STRING_REWARD_TBL(REWARD_VAL ,
        STATE_VAL, ARTISTLIST_VAL,3, STR_DELIMETER);
    -- 3 for artist
    CALL PROC_PROCESS_STRING_REWARD_TBL(REWARD_VAL ,
```

```
        STATE_VAL, ALBUMLIST_VAL,4, STR_DELIMETER);
    -- 4 for album
END;
```

Stored Procedure 3:

```
create procedure PROC_PROCESS_STRING_REWARD_TBL(IN REWARD_VAL
DOUBLE, IN STATE_VAL BIGINT, IN STR_VAL VARCHAR(500), IN TYPE_VAL
INT, IN STR_DELIMETER VARCHAR(10))
BEGIN
    DECLARE LEN,X,Y,Z ,DELIM_LEN INT;
    DECLARE TEMP_STR VARCHAR(500);
    --process genre string
    SET LEN=LENGTH(STR_VAL);
    SET DELIM_LEN=LENGTH(STR_DELIMETER);
    SET X=1;
    SET Y=INSTR(STR_VAL, STR_DELIMETER);
    WHILE LEN>0 DO
        IF Y>0 THEN
            SET Y=Y-X;
            SET TEMP_STR=SUBSTR(STR_VAL,X,Y);
            SET X=X+Y+DELIM_LEN;
            SET STR_VAL = SUBSTR(STR_VAL, X);
            SET X=1;
            SET Y= INSTR(STR_VAL, STR_DELIMETER);
        ELSE
            SET TEMP_STR=SUBSTR(STR_VAL, X);
            SET LEN=0;
        END IF;
        --process here each genre/artist/album
        IF LENGTH(TEMP_STR)>0 THEN
            select count(*) into Z from STATE_PARAM_REWARD where
            STATE=STATE_VAL AND PARAM_NAME= TEMP_STR
            AND PARAM_TYPE= TYPE_VAL;
            IF Z=0 THEN
                CALL
                PROC_PROCESS_STRING_INSERT_REWARD_TBL(
                REWARD_VAL , STATE_VAL, TEMP_STR,
                TYPE_VAL);
            ELSE
                CALL
                PROC_PROCESS_STRING_UPDATE_REWARD_TBL
                (REWARD_VAL , STATE_VAL, TEMP_STR,
                TYPE_VAL);
            END IF;
        END IF;
    -- processing ends
    END WHILE;
END;
```

Stored Procedure 4:

```
create procedure
PROC_PROCESS_STRING_INSERT_REWARD_TBL(IN
REWARD_VAL DOUBLE, IN STATE_VAL BIGINT, IN
PARAMNAME VARCHAR(500), IN PARAMTYPE INT)
BEGIN
    insert into STATE_PARAM_REWARD (STATE,
    PARAM_NAME, PARAM_TYPE, PARAM_VAL,
    VISIT_COUNT ) values (STATE_VAL, PARAMNAME,
    PARAMTYPE, REWARD_VAL,1);
END;
```

Stored Procedure 5:

```
create procedure
PROC_PROCESS_STRING_UPDATE_REWARD_TBL(IN REWARD_VAL
DOUBLE, IN STATE_VAL BIGINT, IN PARAMNAME VARCHAR(500), IN
PARAMTYPE INT)
BEGIN
    DECLARE oldval, newval DOUBLE;
    DECLARE newvistcount INT;
    select PARAM_VAL, VISIT_COUNT into oldval, newvistcount from
    STATE_PARAM_REWARD where STATE=STATE_VAL AND
```

-continued

```
PARAM_NAME= PARAMNAME AND PARAM_TYPE=
PARAMTYPE;
IF oldval IS NULL THEN
    SET oldval =0.0;
END IF;
-- 0.16666667 =1/6 = 1/(no of possible actions)
-- 0.4=discount factor, must be less than 1
SET newval= 0.16666667 * (REWARD_VAL +(0.4* oldval));
IF newvistcount is NULL then
    SET newvistcount=1;
ELSE
    SET newvistcount= newvistcount+1;
END IF;
update STATE_PARAM_REWARD set PARAM_VAL=newval,
VISIT_COUNT=newvistcount where STATE=STATE_VAL AND
PARAM_NAME= PARAMNAME AND PARAM_TYPE=
PARAMTYPE;
END;
```

Recommendation Operation

The recommendation operation is performed by the system 10 to produce a recommendation list. Depending upon the implementation details, the recommendation operation may be performed by the recommendation component 108 (see FIG. 6). In particular implementations, the operation may produce a recommendation list only after the scanning component 102 and feature extractor 100 (see FIG. 6) have gathered some information about available songs stored in the file-system 114 and the learning component 106 has performed the assigning rewards operation thereby assigning some rewards to the feature values associated with the songs that have been listened to by the listener. Thus, the scanning, extracting, and storing operation and the assigning rewards operation should be completed before the recommendation operation. However, performance of the scanning, extracting, and storing operation and the assigning rewards operation may not be sufficient for the recommendation operation to produce the recommendation list. As will be explained below, whether a sufficient condition exists is determined by whether a positive cumulative reward exists.

The recommendation operation implements the underlying principle of reinforcement learning and produces a recommendation list listing songs that have a maximum cumulative reward.

Suppose a set of feature values "$F_\alpha$" (obtained from stored information) is a set of all feature values for a mood state value "$\alpha$" and a particular reward function "$\Psi$" that is a reward mapping function. By way of a non-limiting example, the reward function "$\Psi$" may include the following function:

$$\Psi(\alpha,f)=R_{f\alpha} \text{ if } f \epsilon F_\alpha$$

$$\Psi(\alpha,f)=0 \text{ if } f \text{ does not belongs to } F_\alpha$$

Where $\alpha$=mood state value;

f=any feature value associated with a song; and $R_{f\alpha}$=Reward for the feature value "f" given the mood state value "$\alpha$." $R_{f\alpha}$ is same as $V_{NEW}$ calculated above.

Suppose a song "$s_k$" belongs to a collection of songs "S" (e.g., the songs located by the scanning component 102) and the song "$s_k$" contains a set of feature values "$F_J$," then the cumulative reward "$R_K$" for the song "$s_k$" may be determined using the following formula: the cumulative reward "$R_k$"=$\Sigma R_{f\alpha}$ over f for each feature value $f \epsilon F_J$ and $1 \leq k \leq |S|$, where |S| denotes size of the collection of songs "S."

The system 10 takes all the songs from the collection "S" and picks only those songs for recommendation where $R_k > 0$ for $1 \leq k \leq |S|$. Satisfying this condition indicates a positive cumulative reward. Thus a final recommendation list can be a set expressed by $\{s_k | R_k > 0, 1 \leq k \leq |S|\}$.

Figure 17:
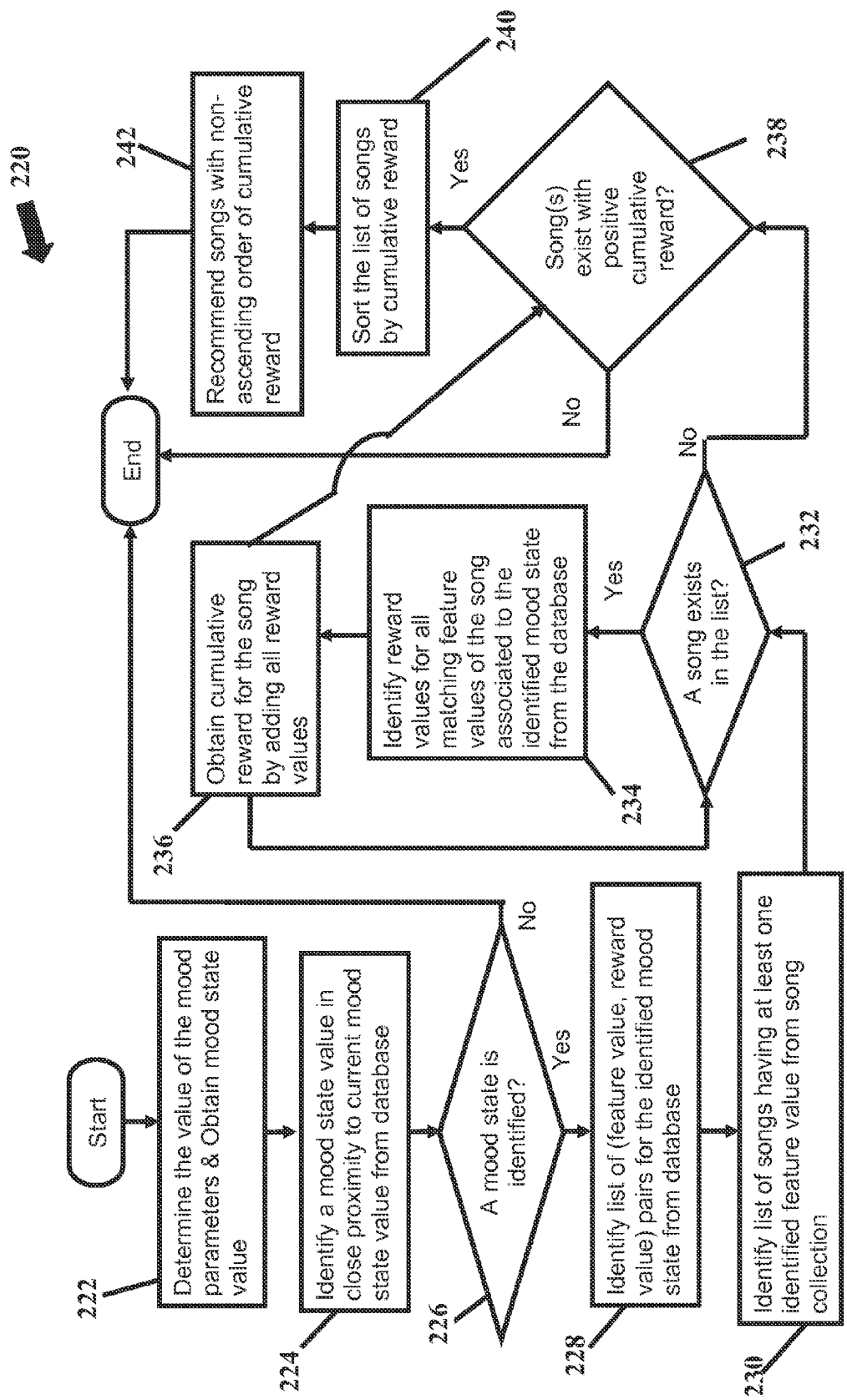
FIG. 17 is a block diagram of method performed by the system of FIG. 6 during a recommendation operation.

Referring to FIG. 17, a block diagram of a method 220 that may be performed by the recommendation component 108 is provided. In first block 222, the system 10 first evaluates the mood state value "$\alpha$" of a listener's current mood for which the system 10 is about to generate a recommendation list. In next block 224, the recommendation component 108 determines whether the table 194 is storing any information for the mood state value "$\alpha$." If it is not, the recommendation component 108 attempts to identify a neighboring mood state value or values (described below) for which the table 194 is storing information. In decision block 226, the recommendation component 108 determines whether it has identified a mood state value for which the table 194 is storing information. If the decision is "YES," the recommendation component 108 advances to block 228. Otherwise, if the decision is "NO," the method 220 terminates.

Then, in block 228, the system 10 identifies the set of feature values "$F_\alpha$" associated with that mood state value "$\alpha$" stored in table 194 (see FIG. 15) of the database 110. As discussed above, in block 226, if the system 10 does not find any entry for a specific mood state value (i.e., the set of feature values "$F_\alpha$" is an empty set), the system 10 assumes it does not have enough information (i.e., has not completed enough learning) and recommendation operation terminates. In block 224, the neighboring mood state value for a given mood state value "$\alpha$" can be calculated by varying one or more of the mood state parameter values and corresponding set of feature values "$F_\alpha$" can be sought. The concept of neighboring mood state and a non-limiting example evaluation of neighboring mood state are described below.

Assuming a particular mood state value "$\alpha$" has a dependency on parameters "P," the values of the parameters "P" may be given by $N_1, N_2, \ldots$, up to $N_P$. Then, neighboring mood-state parameters values may be defined that vary between plus $\delta$ and minus $\delta$ of each parameter value $N_1, N_2, \ldots$, up to $N_P$ at the particular mood state value "$\alpha$." A neighbor mood state value "$\alpha_N$" is any mood state value drawn from a set "M" formed by choosing a value for each parameter within the defined range and this set M can be expressed as $\{[N_1-\delta, N_1+\delta], [N_2-\delta, N_2+\delta], \ldots, [N_P-\delta, N_P+\delta]\}$.

The decision in decision block 226 is "YES" when the system 10 finds at least one feature value for the particular mood state value "$\alpha$" from the past entries of all mood state values and related information (at least one database row in the database table 194 defined in FIG. 15 having a mood state value in the field "STATE" that matches the particular mood state value "α"). Thus, when the decision in decision block 226 is "YES", the system 10 assumes that its learning has reached to a satisfactory level and it can endeavor to generate a recommendation list.

In block 230, the system 10 identifies all songs in the collection of songs "S," such that each song "$s_k$" with the set of feature values "$F_j$" has at least one matching (or corresponding) feature value with the set of feature values "$F_α$." Thus, each song "$s_k$" must satisfy the condition that the set intersection of the set of feature values "$F_j$" and the set of feature values "$F_α$" is not an empty set (i.e., $|F_j \cap F_α|>0$).

In decision block 232 whether block 230 has identified any songs is determined. If block 230 identified at least one song, the decision in decision block 232 is "YES" and the recommendation component 108 advances to block 234. If block 230 did not identify at least one song, the decision in decision block 232 is "NO" and the recommendation component 108 advances to decision block 238.

In block 234, the recommendation component 108 obtains a reward value for each feature of each song identified in block 230 also present in the set of feature values "$F_α$." Thus, a reward for a feature value is given to a song if the feature value belongs to the set of feature values "$F_α$" and consequently each song identified in block 230 will accumulate rewards from the feature values that are common to this song and to the set of feature values "$F_α$." Example 2 at the end of this section provides an illustration of this process.

In block 236, a cumulative reward is calculated for each song identified in block 230. For a song identified in block 230, its cumulative reward is calculated by totaling the rewards assigned to any feature of the song having a value also found in the set of feature values "$F_α$." Then, the recommendation component 108 advances to decision block 238.

In decision block 238, the recommendation component 108 determines whether any songs exist in the table 194 that have a positive cumulative reward (described below). If none exist, the decision in decision block 238 is "NO," and the method 220 terminates. Otherwise, the recommendation component 108 advances to block 240 whereat songs are sorted by their cumulative awards to create a sort order (e.g., non-descending). In block 242, the sorted songs are recommended to the listener. Then, the method 220 terminates.

Alternatively, in decision block 238, the recommendation component 108 may attempt to identify neighbor songs. To identify one or more neighboring songs, the feature values for the particular mood state value "α" and set of feature values "$F_α$" for the particular mood state value can be calculated by finding all feature values from the acoustic features contained in the set of feature values "$F_α$." The feature values obtained in this manner are referred to as neighboring feature values and the songs that contain at least one neighboring feature value are referred to as neighboring songs of the given song whose feature values were the basis of finding neighboring feature values. The above described process of finding recommendation list can be executed by replacing $F_α$ with $F'_α$, where $F'_α=F_α+F_{αN}$ and $F_{αN}$ contains all neighbor feature values derived from the acoustic feature values contained in the set of feature values "$F_α$." If the neighboring feature values are limited to be within ±Δ, then neighboring feature values of any given acoustic feature value "$f_{ac}$" is a set satisfying the range limit given by $\{[f_{ac}-Δ, f_{ac}+Δ]\}$.

Then, in block 240, the songs identified are sorted (e.g., in non-ascending order) according to their cumulative reward values and recommended to the user in block 242.

In case of a tie, the system 10 may allow the database 110 to resolve the tie at execution time and thereby allow certain exploration in the artificial intelligence aspects of the system.

As mentioned above, the system 10 considers a song eligible for entry in the recommendation list if the song's cumulative reward is positive ($R_k>0$ for $1 \leq k \leq |S|$). Thus, the search may locate a list of songs all having a negative or zero cumulative reward. In such cases, the recommendation operation does not produce a recommendation list of songs. Finally, all songs that have positive cumulative reward may be provided to the listener in the recommendation list, which may be sorted in non-ascending order of cumulative reward.

Thus, the system 10 may be used to produce a recommendation list based on the maximum cumulative reward based algorithm that takes into consideration the plausible influence of human mood.

Human mood presents a complex paradigm for research and capturing mood using a restricted resource, such as the computing device 20 (see FIG. 18), presents many limitations, including the possibility that the values of the parameters the system evaluates may be inaccurate even if correctly evaluated. Nevertheless, it is believed that by assigning a positive reward value to playback events that indicate the user likes a song and negative reward values to playback events that indicate the user dislikes a song, the system 10 captures a user's like or dislike of a song accurately irrespective of other factors that may be influencing that opinion.

EXAMPLE 2

Generating a Recommendation List

In this example, the current mode state value "α" is 5317, the set of feature values "$F_α$" for this mood state value (based on past experience recorded in table 194) is {"Rock", "Pop", "Artist1"}, which are assigned the following reward values: Rock=100, Pop=60, and Artist1=−50. The available collection of songs "S" includes "Song1" with feature values {"Rock", "Artist1", "Album1", "123", "5768"}, "Song2" with feature values {"Rock", "Artist2", "361", "5798"}, "Song3" with feature values {"Pop", "Artist3", "Album3", "673", "5868"} and "Song4" with feature values {"Artist1", "223", "12768"}. The cumulative reward for these songs can be calculated as follows:

Cumulative reward for "Song1"=Reward from the feature values of "Song1" common to set of feature values "$F_α$"=Reward from "Rock"+Reward from "Artist1"=100−50=50

Cumulative reward for "Song2"=Reward from the feature values of "Song2" common to set of feature values "$F_α$"=Reward from "Rock"=100

Cumulative reward of "Song3"=Reward from the feature values of "Song3" common to set of feature values "$F_α$"=Reward from "Pop"=60

Cumulative reward of "Song4"=Reward from the feature values of "Song4" common to set of feature values "$F_α$"=Reward from "Artist1"=−50

The system 10 will not consider "Song4" for recommendation, because "Song4" has a negative cumulative reward. The system 10 will sort the three songs considered "Song1," "Song2," "Song3" in non-ascending order and present them to the listener as a recommendation list sorted in a non-ascending cumulative reward sequence having the following ordering: "Song2," "Song3," and "Song1".

By way of a non-limiting example, the system 10 may use database stored procedures to provide the recommendation list. For example, the database stored procedure "PROC_

BUILD_RECOMMENDATION_LIST" defined below as Stored Procedure 6 may be used.

After the recommendation component 108 has generated the recommendation list, the user may use the checkbox 147 of the user interface 140 illustrated in FIG. 8 to play songs on the recommendation list.

Stored Procedure 6:

```
create procedure PROC_BUILD_RECOMMENDATION_LIST (IN STATE_VAL
BIGINT, IN RANGE INT)
BEGIN
    select MEDIA.ID,
    CONCAT(MEDIA.FILELOC,MEDIA.NAME),TEMP.TOTAL_REWARD from
    MEDIA,(
    select MEDIA_ID as ID, sum(REWARD) as TOTAL_REWARD from (
    select MEDIA_GENRE.MEDIA_ID, genre_reward.REWARD from
    MEDIA_GENRE, ( select g.ID, s.PARAM_VAL as REWARD from
    GENRE_TABLE g, STATE_PARAM_REWARD s where s.STATE=
    STATE_VAL and s.PARAM_TYPE=2 and s.PARAM_NAME=g.NAME )
    genre_reward where MEDIA_GENRE.GENRE_ID= genre_reward.ID
    union all
    select MEDIA_ARTIST.MEDIA_ID, artist_reward.REWARD from
    MEDIA_ARTIST, ( select a.ID, s.PARAM_VAL as REWARD from
    ARTIST_COMPOSER a, STATE_PARAM_REWARD s where s.STATE=
    STATE_VAL and s.PARAM_TYPE=3 and s.PARAM_NAME=a.NAME )
    artist_reward where MEDIA_ARTIST.ARTIST_COMPOSER_ID =
    artist_reward.ID
    union all
    select MEDIA_ALBUM.MEDIA_ID, album_reward.REWARD from
    MEDIA_ALBUM, ( select a.ID, s.PARAM_VAL as REWARD from ALBUM a,
    STATE_PARAM_REWARD s where s.STATE= STATE_VAL and
    s.PARAM_TYPE=4 and s.PARAM_NAME=a.TITLE ) album_reward where
    MEDIA_ALBUM.ALBUM_ID= album_reward.id
    union all
    select MEDIA.ID AS MEDIA_ID, s.PARAM_VAL as REWARD from MEDIA,
    STATE_PARAM_REWARD s where s.STATE= STATE_VAL and
    s.PARAM_TYPE=5 and s.PARAM_NAME!=-1 and
    MEDIA.FREQ_HASH_30SEC BETWEEN GREATEST(((s.PARAM_NAME
    DIV 128)*128),(s.PARAM_NAME- RANGE)) AND
    LEAST(((s.PARAM_NAME DIV 128)*128)+127, (s.PARAM_NAME+
    RANGE ))
    union all
    select MEDIA.ID AS MEDIA_ID, s.PARAM_VAL as REWARD from MEDIA,
    STATE_PARAM_REWARD s where s.STATE= STATE_VAL and
    s.PARAM_TYPE=6 and s.PARAM_NAME!=-1 and
    MEDIA.FREQ_HASH_WHOLE BETWEEN
    GREATEST(((s.PARAM_NAME DIV 128)*128),(s.PARAM_NAME-
    RANGE)) AND LEAST(((s.PARAM_NAME DIV 128)*128)+127,
    (s.PARAM_NAME+ RANGE))
    ) media_reward group by MEDIA_ID) TEMP
    WHERE TEMP.TOTAL_REWARD> 0 AND MEDIA.ID=TEMP.ID order by
    TEMP.TOTAL_REWARD desc limit 0, 100;
END;
```

Referring to FIG. 8, in particular implementations, while playing a song, the system 10 shows the lyrics of the song in the lyrics display area 150 (see FIG. 8). Other relevant information, such as genre, and the like may also be displayed to the listener in the lyrics display area 150. Being able to view the lyrics and/or other relevant information provides a new experience to the listener.

Optionally, the system 10 determines a play sequence in which to play the songs in a playlist rather than playing the songs in the top-to-bottom sequential order in which they appear in the playlist list. This concept may be referred to as an "Intelligent Play Mode." The play sequence may be determined based on the cumulative reward of the songs in the playlist and calculated based on the mood state value of the listener as described above.

If the cumulative reward cannot be evaluated for a song in the playlist, a hash value of the frequencies based on entire duration (e.g., the acoustic feature "FREQ_HASH_W-HOLE") of a song may be used as its cumulative reward. The playlist is then sorted by the cumulative rewards assigned to each song and songs are played in accordance with the sort order. For example, the play sequence may play a first song then a second song having the smallest cumulative reward that is greater than the cumulative reward of the first song. Next, the system 10 may play a third song having a highest cumulative reward that is less than the cumulative reward of the first song. Next, the system may play a fourth song having the smallest cumulative reward that is greater than the cumulative reward of the second song followed by a fifth song having the highest cumulative reward that is less than the cumulative reward of the third song, and so forth.

The first song may be the song that appears in the middle of the sorted play sequence. For example, if the cumulative rewards assigned to each of a collection of songs (as they appear from top to bottom) are {3,4,9,1,8,10,2,5,6,7}, by sorting the cumulative rewards in non-ascending order the following sorted list is obtained: {10,9,8,7,6,5,4,3,2,1}. The play sequence for this sorted list will be (5,6,4,7,3,8,2,9,1, 10).

Figure 9:
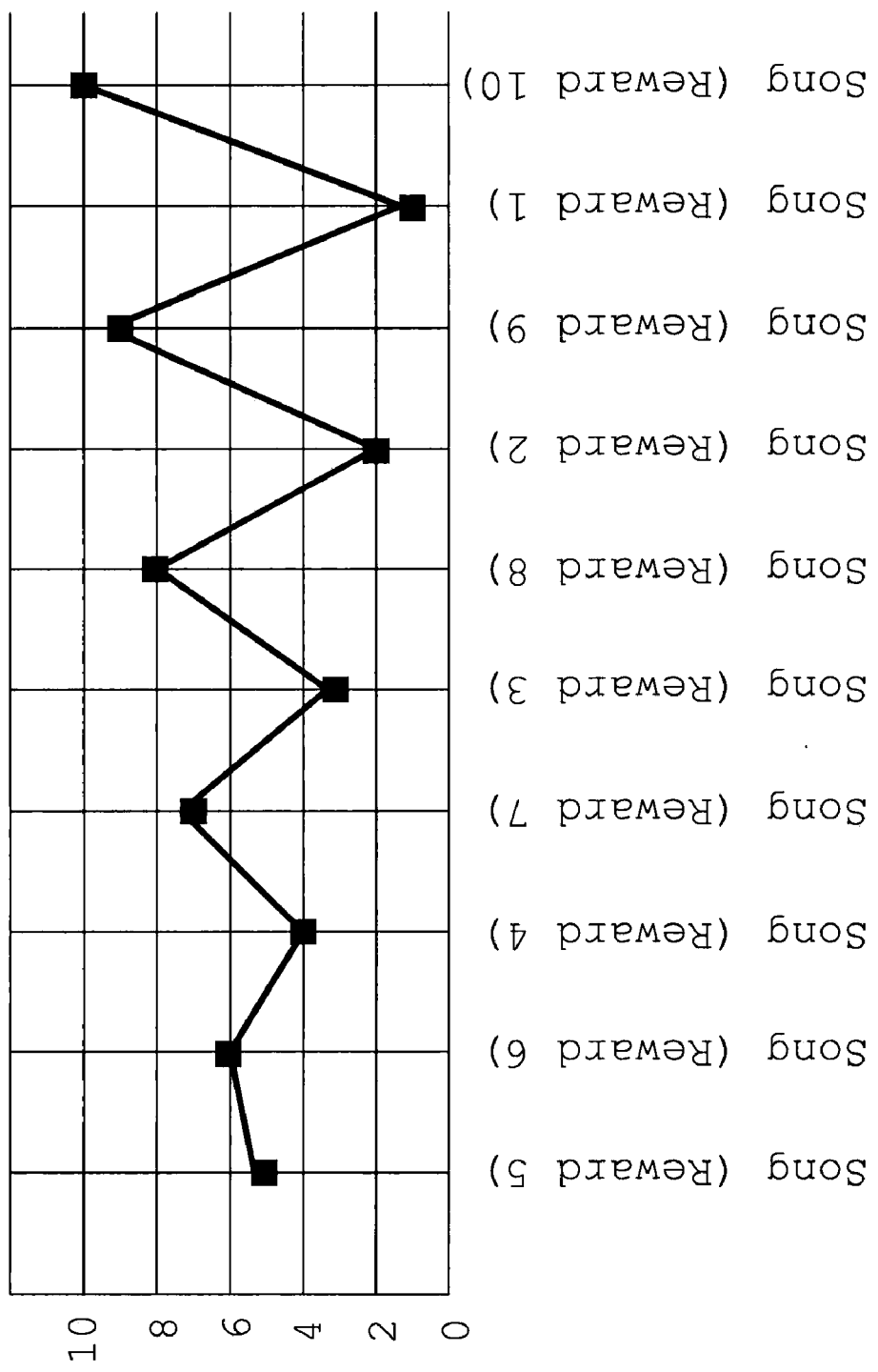
FIG. 9 is a graph depicting user listening experience along the y-axis and a song play order referred to as Intelligent Play Mode along the x-axis, a cumulative reward assigned to each song in the play order is also shown.
Figure 10:
FIG. 10 is a description of a database table named "MEDIA" stored in a database of the system of FIG. 6.

Assuming listening experience is proportional to the cumulative reward of a song, the play sequence produces a zigzag shaped curve depicted in FIG. 9. The play sequence may lure the listener to continue listening because the listening experience is improving the longer the listener listens. In other words, songs having a higher cumulative reward are played in non-ascending order (for example, a portion of the songs played after the song having a cumulative reward of 7 has even higher cumulative rewards). This play sequence also has the advantage that relatively low cumulative reward songs (e.g., the song having a cumulative reward of 4) will be accompanied by two higher reward songs (e.g., the songs having cumulative rewards of 6 and 7). Thus, the listener will not experience dissatisfaction for a continuous period of listening time.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method performed by a music playback device operable by a listener having a mood, the method comprising:
    identifying a plurality of songs;
    obtaining one or more sets of feature values, each set being associated with one of the plurality of songs, and each feature value being associated with the song;
    for each of at least a portion of the plurality of songs, determining a first reward amount based on the operation of the music playback device with respect to the song;
    determining a plurality of first mood state values, each of the first mood state values being determined as a function of a set of predetermined parameters correlated with the listener's mood;
    associating each of the first mood state values with the set of feature values associated with one or more of the plurality of songs,
    for each set of feature values associated with one or more of the first mood state values, assigning a second reward amount to each of the feature values of the set of feature values, the second reward amount being calculated as a function of the first reward amount determined for the song associated with the set of feature values;
    determining a current mood state value as a function of the set of predetermined parameters correlated with the listener's mood, the current mood state value being identical to one of the plurality of first mood state values;
    identifying one or more feature values associated with the current mood state value;
    identifying one or more of the plurality of songs associated with the one or more feature values also associated with the current mood state value;
    for each of the one or more of the identified plurality of songs, calculating a cumulative reward by totaling the second reward amount assigned to any feature values associated with the current mood state value that are also associated with the song; and
    recommending one or more of the identified plurality of songs based on the cumulative reward calculated for each.

2. The method of claim 1, further comprising:
    playing a first song of the plurality of songs;
    detecting a playback event has occurred;
    identifying an event reward value associated with the playback event detected;
    determining a second mood state value as a function of the set of predetermined parameters correlated with the listener's mood, the second mood state value being identical to one of the plurality of first mood state values; and
    associating the second mood state value with the set of feature values associated with the first song and for each feature value of the set of feature values associated with the first song, assigning a third reward amount to the feature value associated with the second mood state value, the third reward amount being calculated as a function of the second reward amount.

3. The method of claim 1, wherein recommending one or more of the identified plurality of songs based on the cumulative reward calculated for each comprises:
    sorting the one or more of the plurality of songs in non-descending order based on cumulative reward to obtain a sort order and recommending the one or more of the plurality of songs in accordance with the sort order.

4. The method of claim 1, wherein recommending one or more of the identified plurality of songs based on the cumulative reward calculated for each comprises:

sorting the one or more of the plurality of songs based on cumulative reward and recommending that a song in the middle of the sort order be played first.

5. The method of claim 1, wherein recommending one or more of the identified plurality of songs based on the cumulative reward calculated for each comprises:
sorting the one or more of the plurality of songs based on cumulative reward and recommending that a song in the middle of the sort order be played first, a song having a cumulative reward greater than the middle song be played second, and a song having a cumulative reward less than the middle song be played third.

6. The method of claim 1, further comprising:
if two or more of songs of the portion of the plurality of songs have an identical feature value and are associated with an identical first mood state value, determining a new reward amount as a function of the first reward amount determined for each of the two or more of songs and assigning the new reward amount as the second reward amount to the feature value.

7. The method of claim 1, further comprising:
determining a second mood state value and a third reward amount based on the operation of the music playback device with respect to a particular song of the portion of the plurality of songs, the second mood state value being identical to one of the plurality of first mood state values;
for each feature value of the set of feature values associated with the particular song, assigning a fourth reward amount to the feature value, the fourth reward amount being calculated as a function of the third reward amount and any reward amount previously assigned to the feature value; and
for each feature value of the set of feature values associated with the particular song but not also associated with the second mood state value, associating the feature value with the second mood state value and assigning the third reward amount to the feature value.

8. The method of claim 1, further comprising:
determining a second mood state value as a function of the set of predetermined parameters correlated with the listener's mood;
determining none of the feature values associated with the plurality of first mood state values are associated with the second mood state value;
selecting a range of the plurality of first mood state values;
obtaining a new set of feature values associated with the mood state values in the range of the plurality of first mood state values;
identifying as selected songs one or more of the plurality of songs associated with one or more of the feature values in the new set of feature values;
for each of the selected songs, calculating a cumulative reward by totaling the second reward amount assigned to any feature values in the new set of feature values that are also associated with the song; and
recommending one or more of the selected songs to the listener based on the cumulative reward calculated for each.

9. The method of claim 1, wherein recommending the one or more of the identified plurality of songs based on the cumulative reward calculated for each comprises excluding any of the one or more of the identified plurality of songs having a cumulative reward less than or equal to zero.

10. The method of claim 1, wherein the one or more sets of feature values comprise both metadata features and acoustic features.

11. The method of claim 1, wherein the set of predetermined parameters correlated with the listener's mood comprises a day of week on which playback of at least one of the portion of the plurality of songs occurred.

12. The method of claim 1, wherein the set of predetermined parameters correlated with the listener's mood comprises a play volume at which playback of at least one of the portion of the plurality of songs occurred.

13. The method of claim 1, wherein the set of predetermined parameters correlated with the listener's mood comprises an identifier associated with time of day at which playback of at least one of the portion of the plurality of songs occurred.

14. The method of claim 1, wherein the set of predetermined parameters correlated with the listener's mood comprises a measure of listener activity with respect to a component of the user interface over a predetermined duration.

15. The method of claim 1, wherein the set of predetermined parameters correlated with the listener's mood comprises an indication of the weather when playback of at least one of the portion of the plurality of songs occurred.

16. The method of claim 1, wherein identifying the plurality of songs comprises scanning a file system for audio files stored thereon.

17. A music playback device operable by a listener having a mood, the music playback device comprising:
a file system;
a set of user controls;
at least one loud speaker;
an audio playback component coupled to the at least one loud speaker and the set of user controls, the audio playback component being configured to play audio files;
at least one processor in communication with the file system, the audio playback component, and the set of user controls;
a memory comprising data and instructions, the data comprising stored feature values each associated with both a stored mood state value and a stored reward amount, the instructions being executable by the at least one processor, the instructions when executed by the at least one processor implementing:
a scanning component configured to scan the file system for music files and identify at least a portion of the music files located as a collection of songs, the audio playback component being configured to play a first song of the collection of songs to the listener via the at least one loud speaker;
a mood evaluator configured to determine a value for each of a plurality of parameters reflective of a listener's mood and determine a mood state value based on the values of the set of parameters, the mood state value being identical to the stored mood state value;
a feature extractor configured to extract a set of feature values from each song of the collection of songs;
a learning component configured to detect when the listener has operated one of the set of user controls, generate a playback event based on the operation of the one of the set of user controls, identify an event reward value associated with the playback event detected, associate the mood state value with the set of feature values for the first song, assign a reward value based on the event reward value to each of the feature values for the first song that are associated with the mood state value, add one or more of the feature values to the stored feature values, and associate each of the one or more added feature values with both the mood state value and the reward amount assigned to the feature value; and a recommendation component configured to obtain the stored feature values associated with the stored mood state value, and identify one or more songs other than the first song having a feature value that is identical to one of the stored feature values, the recommendation component being further configured to calculate a cumulative reward for each song identified as a function of the reward value associated with each stored feature value that is identical to one of the feature values of the identified song, and recommend at least a portion of the one or more identified songs to the user based on the cumulative reward.

18. The music playback device of claim 17, wherein the recommendation component is further configured to generate a recommendation list, and the music playback device further comprises:

a display coupled to the at least one processor, the recommendation component being further configured to display a recommendation list to the listener via the display.

19. The music playback device of claim 17, further comprising:

a display coupled to the at least one processor, the scanning component being further configured to display a playlist comprising at least a portion of the collection of songs to the listener via the display, the set of user controls being further configured to allow the user to select the first song from the playlist.

20. A music playback device operable by a listener having a mood, the music playback device comprising:

means for identifying a plurality of songs stored on a file system;

means for obtaining one or more sets of feature values, each set being associated with one of the plurality of songs, and each feature value being associated with the song;

for each of at least a portion of the plurality of songs, means for determining a first reward amount based on the operation of the music playback device with respect to the song, means for determining a plurality of first mood state values, each of the first mood state values being determined as a function of a set of predetermined parameters correlated with the listener's mood;

means for associating each of the first mood state values with the set of feature values associated with one or more of the plurality of songs, means for assigning a second reward amount to each of the feature values of each of the one or more sets of feature values associated with one or more of the first mood state values, the second reward amount being calculated as a function of the first reward amount determined for the song associated with the set of feature values means for determining a current mood state value as a function of the set of predetermined parameters correlated with the listener's mood, the current mood state value being identical to one of the plurality of first mood state values;

means for identifying one or more feature values associated with the current mood state value;

means for identifying one or more of the plurality of songs having a set of feature values including a feature value also associated with the current mood state value;

for each of the one or more of the identified plurality of songs, means for calculating a cumulative reward by totaling the second reward amount assigned to any feature values associated with the current mood state value that are also associated with the song; and means for recommending one or more of the identified plurality of songs based on the cumulative reward calculated for each.

* * * * *